US012485349B2

(12) United States Patent
Biwasaka et al.

(10) Patent No.: US 12,485,349 B2
(45) Date of Patent: Dec. 2, 2025

(54) STORAGE MEDIUM STORING GAME PROGRAM, GAME SYSTEM, GAME APPARATUS, AND GAME PROCESSING METHOD

(71) Applicant: NINTENDO CO., LTD., Kyoto (JP)

(72) Inventors: Shinichiro Biwasaka, Kyoto (JP); Atsushi Asakura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 392 days.

(21) Appl. No.: 18/328,657

(22) Filed: Jun. 2, 2023

(65) Prior Publication Data

US 2024/0082730 A1 Mar. 14, 2024

(30) Foreign Application Priority Data

Sep. 12, 2022 (JP) ................................ 2022-144902

(51) Int. Cl.
*A63F 13/56* (2014.01)
*A63F 13/42* (2014.01)
*A63F 13/577* (2014.01)

(52) U.S. Cl.
CPC ............ *A63F 13/577* (2014.09); *A63F 13/42* (2014.09); *A63F 13/56* (2014.09)

(58) Field of Classification Search
CPC .................................................... A63F 13/577
See application file for complete search history.

(56) References Cited

U.S. PATENT DOCUMENTS

2010/0160045 A1 6/2010 Yamada et al.
2010/0173706 A1 7/2010 Nakahara et al.
2019/0099668 A1* 4/2019 Aliakseyeu ........ H05B 47/1985

FOREIGN PATENT DOCUMENTS

JP 2008-304967 12/2008
JP 2010-142561 7/2010
JP 2019-136070 8/2019

OTHER PUBLICATIONS

Feb. 26, 2024 Office Action issued in Japanese Patent Application No. 2022-144902, pp. 1-5 [machine translation included].
Monster Hunter World Strategy Wiki Summary [MHW], Gamerch [online], Dec. 17, 2021, https://gamerch.com/mhw/entry/307398 [Searched on Feb. 19, 2024] pp. 1-7.
[Monster Hunter World] Summary of basic operations for each weapon and combo route table included, Monster Hunter World: Iceborne Strategy Wiki [MHWI Strategy], Sep. 5, 2019, https://wiki.denfaminicogamer.jp/monsterhunterworld/ [illegible] [Searched on Feb. 19, 2024] pp. 1-15.
(Continued)

*Primary Examiner* — Jay Trent Liddle
(74) *Attorney, Agent, or Firm* — Nixon & Vanderhye PC

(57) ABSTRACT

Movement control of a player character in a virtual space is performed based on a user's operation input. When it is determined that an impact has been applied to a first object in the virtual space, the first object, or a second object instead of the first object, is installed on a terrain object related to a location where the impact has been applied to the first object, and lighting is set in the virtual space such that a range around the location where the first or second object is installed is lighter than before the installation.

26 Claims, 24 Drawing Sheets

(56) References Cited

OTHER PUBLICATIONS

Akinori Okamoto, Nintendo Game Strategy Guide NintendoDream Mario & Luigi RPG 2×2, 1st edition, Mainichi Communications Inc.., Feb. 15, 2006 , pp. 18, 115.

The Legend of Zelda Breath of the Wild: Nintendo Official Guidebook, Shogakukan Inc, May 11, 2017, p. 211, with English translation.

* cited by examiner

STORAGE MEDIUM STORING GAME PROGRAM, GAME SYSTEM, GAME APPARATUS, AND GAME PROCESSING METHOD

CROSS REFERENCE TO RELATED APPLICATION

This application claims priority to Japanese Patent Application No. 2022-144902, filed on Sep. 12, 2022, the entire contents of which are incorporated herein by reference.

FIELD

The technology disclosed herein relates to game program-storing storage media, game systems, game apparatuses, and game processing methods that perform a process using a player character in a virtual space.

BACKGROUND AND SUMMARY

There has conventionally been a game apparatus that executes a game program for exploring a dark region in a virtual space using a light source. For example, in such a game apparatus, a player character is enabled to explore a dark region by moving while carrying a light source such as a torch in a particular scene in a game.

However, for the above game apparatus, the use of the light source used by the player character is limited.

With the above in mind, it is an object of the present example to provide a game program-storing, computer-readable storage medium, game system, game apparatus, and game processing method capable of facilitating exploration of a virtual space by utilizing lighting.

To achieve the object, the present example may have features (1) to (12) below, for example.

(1)

An example configuration of a non-transitory computer-readable storage medium having stored therein a game program causes a computer of an information processing apparatus to perform operations comprising: performing movement control of a player character in a virtual space, based on a user's operation input; and when it is determined that an impact has been applied to a first object in the virtual space, installing the first object, or a second object instead of the first object, on a terrain object related to a location where the impact has been applied to the first object, and setting lighting in the virtual space such that a range around the location where the first or second object is installed is lighter than before the installation.

With the configuration of (1), the first or second object can be installed at any location on the terrain object, so that surrounding of the installation location can be illuminated even in the dark space. Therefore, exploration of the virtual space can be facilitated by utilizing lighting set by installing the first or second item object at various locations.

(2)

In the configuration of (1), the game program may further cause the computer to perform operations comprising: executing a process of causing the player character to perform at least an attack action, based on the user's operation input; and when the first object is included in a range in which the first object is affected by the attack action, determining that the impact has been applied to the first object.

With the configuration of (2), by causing the player character to perform an attack action, the first or second object can be newly installed.

(3)

In the configuration of (1), the game program may further cause the computer to perform operations comprising: executing a process of causing the player character to perform at least an attack action, based on the user's operation input; and when the first object hits another object due to the attack action, determining that the impact has been applied to the first object.

With the configuration of (3), by causing the player character to perform an attack action, the first or second object can be newly installed.

(4)

In the configuration of (2), the game program may further cause the computer to perform operations comprising: executing a process of causing the player character to perform an action of launching the first object in the virtual space as the attack action, based on the user's operation input; and when the first object launched by the launching action hits the terrain object, determining that the impact has been applied to the first object.

With the configuration of (4), by causing player character to perform an attack action, the first or second object can be installed at a location distant from the player character.

(5)

In the configuration of (2) or (3), the attack action may be a proximity attack action used in a range that is directly reached by the player character itself or an object with which the player character is equipped.

With the configuration of (5), by causing the player character to perform an attack action, the first or second object can be installed at a location in the vicinity of the player character.

(6)

In the configuration of (5), the game program may further cause the computer to perform operations comprising: generating a combination object by combining the first object with an equipment object with which the player character is allowed to be equipped, based on the user's operation input; executing a process of causing the player character to perform the proximity attack action using the combination object, based on the user's operation input; and when the combination object hits the terrain object due to the proximity attack action, determining that the impact has been applied to the first object included in the combination object.

With the configuration of (6), by using the player character's equipment combined with the first object, the first or second object can be newly installed.

(7)

In the configuration of (1), the game program may further cause the computer to perform operations comprising: when the first object hits another object at a first speed or more in the virtual space, determining that the impact has been applied to the first object.

With the configuration of (7), by causing the player character to perform an action of moving the first object at the first speed or more, the first or second object can be newly installed.

(8)

In the configuration of (7), the game program may further cause the computer to perform operations comprising: executing a process of causing the player character to perform an action of launching the first object in the virtual space, based on the user's operation input; and when the first object launched by the launching action hits the terrain object at the first speed or more, determining that the impact has been applied to the first object.

With the configuration of (8), by causing the player character to perform an action of moving the first object to a distant location, the first or second object can be installed at a location distant from the player character.

(9)

In the configuration of (7), the game program may further cause the computer to perform operations comprising: executing a process of causing the player character to perform an action of dropping the first object in the virtual space, based on the user's operation input; and when the first object dropped by the dropping action hits the terrain object at the first speed or more, determining that the impact has been applied to the first object.

With the configuration of (9), by causing the player character to perform an action of dropping the first object, the first or second object can be easily installed.

(10)

In the configuration of one of (1) to (9), the game program may further cause the computer to perform operations comprising: automatically controlling actions of an opponent character in the virtual space; and removing the first or second object installed in the virtual space, depending on an action of the opponent character.

With the configuration of (10), by allowing the installed first or second object to be removed from the virtual space, the difficulty of a game can be adjusted, compared to the case in which the first or second object can be installed without limitation.

(11)

In the configuration of one of (1) to (10), the game program may further cause the computer to perform operations comprising: when the number of the first and second objects installed in the virtual space reaches a first value, or when a first period of time has passed since the installation of the first and second objects on the terrain object, removing at least one of the first and second objects installed in the virtual space.

With the configuration of (11), by imposing a limitation on the installation of the first or second object, the difficulty of a game can be adjusted.

(12)

In the configuration of one of (1) to (11), the first object may be allowed to be obtained and possessed by the player character in the virtual space.

The configuration of (12) can provide an incentive for the user to search for the first object in exploration of the virtual space.

The present example may also be carried out in the form of a game system, game apparatus, and game processing method.

According to the present example, exploration of a virtual space can be facilitated by utilizing lighting set by installing a first or second object.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

A game system according to the present example will now be described. An example of a game system 1 according to the present example includes a main body apparatus (information processing apparatus serving as the main body of a game apparatus in the present example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present example is described, and thereafter, the control of the game system 1 of the present example is described.

Figure 1:
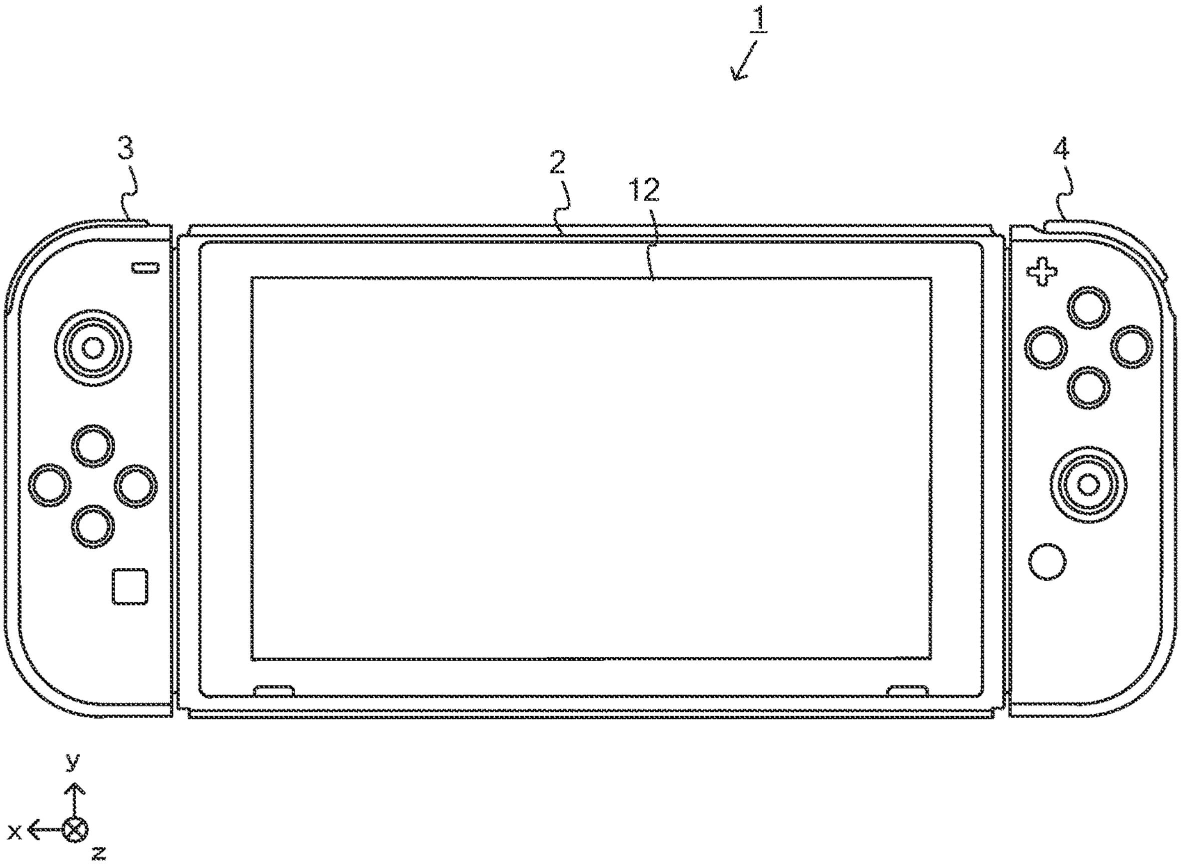
FIG. 1 is a diagram illustrating a non-limiting example of a state where a left controller 3 and a right controller 4 are attached to a main body apparatus 2.

FIG. 1 is a diagram illustrating an example of the state where the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
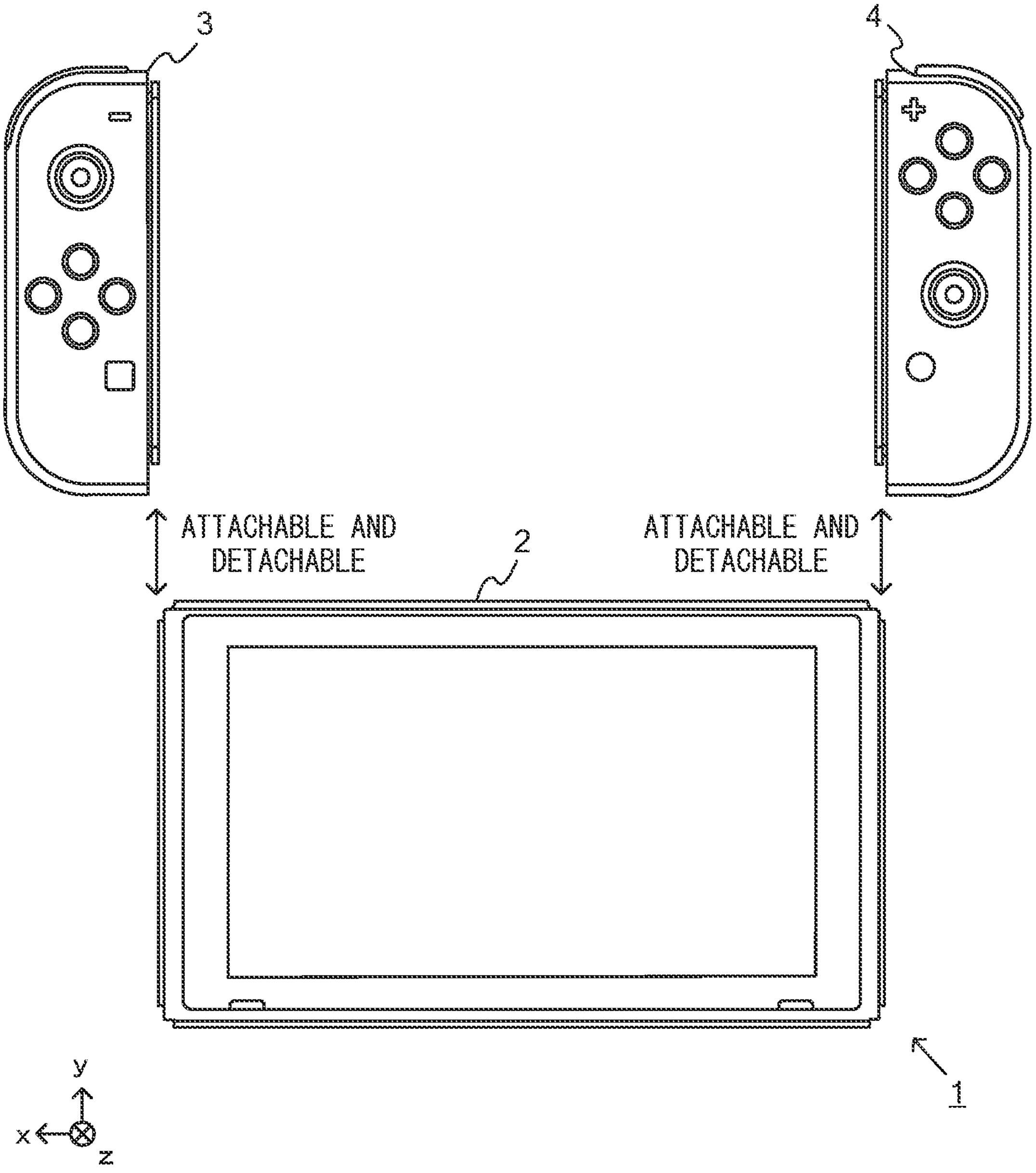
FIG. 2 is a diagram illustrating a non-limiting example of a state where a left controller 3 and a right controller 4 are detached from a main body apparatus 2.

FIG. 2 is a diagram illustrating an example of the state where each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a “controller”.

Figure 3:
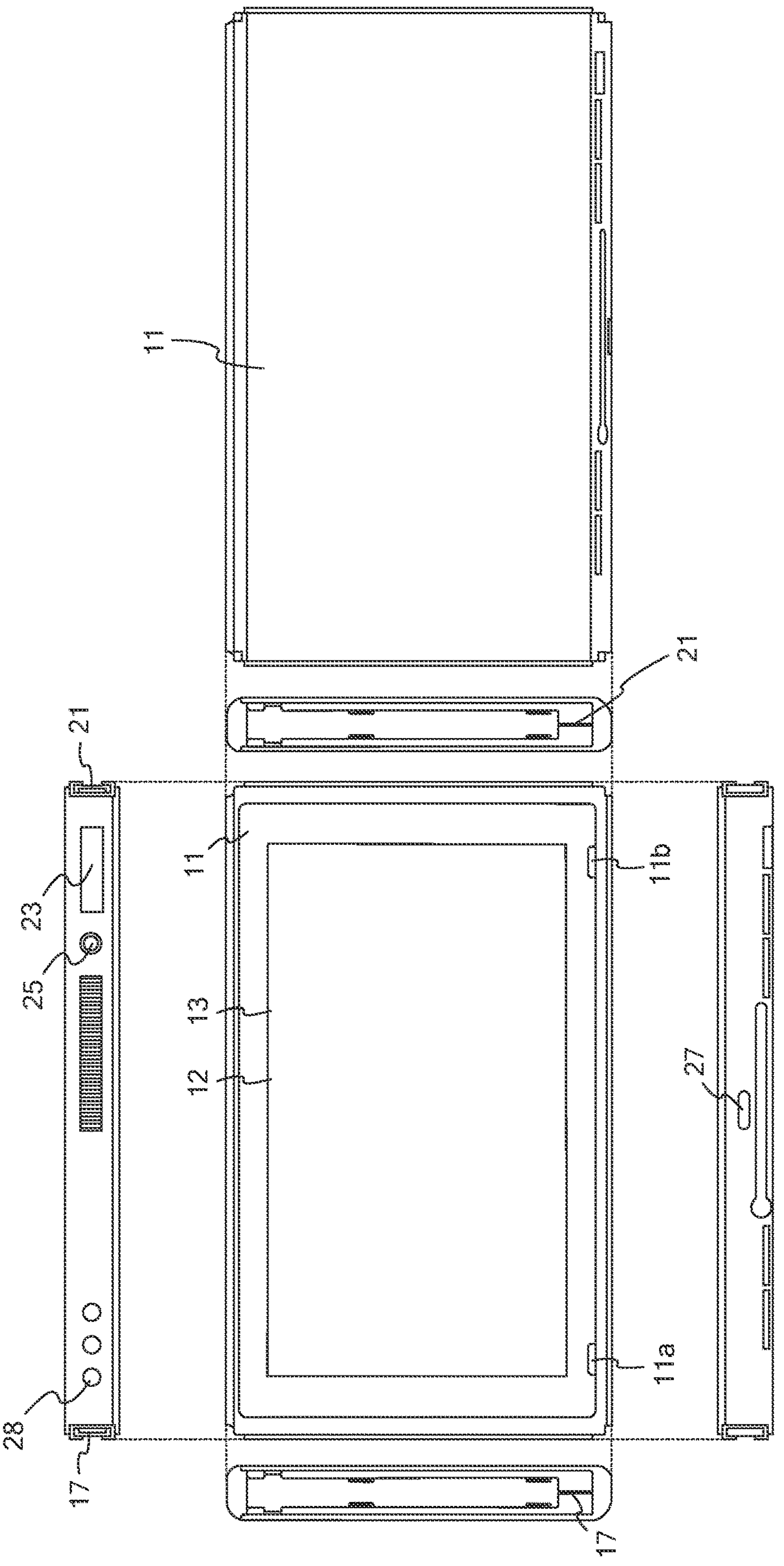
FIG. 3 illustrates six orthogonal views of a non-limiting example of a main body apparatus 2.

FIG. 3 illustrates six orthogonal views of an example of the main body apparatus 2. As illustrated in FIG. 3, the main body apparatus 2 includes an approximately plate-shaped housing 11. In the present example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present example, the display 12 is a liquid crystal display device (LCD). The display 12, however, may be a display device of any suitable type.

In addition, the main body apparatus 2 includes a touch panel 13 on the screen of the display 12. In the present example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11*a* and 11*b* are formed in the main surface of the housing 11. The speaker 88 outputs sounds through the speaker holes 11*a* and 11*b*.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present example, the cradle has the function of charging the unified apparatus or the main body apparatus 2 alone, being placed thereon. The cradle also functions as a hub device (specifically, a USB hub).

Figure 4:
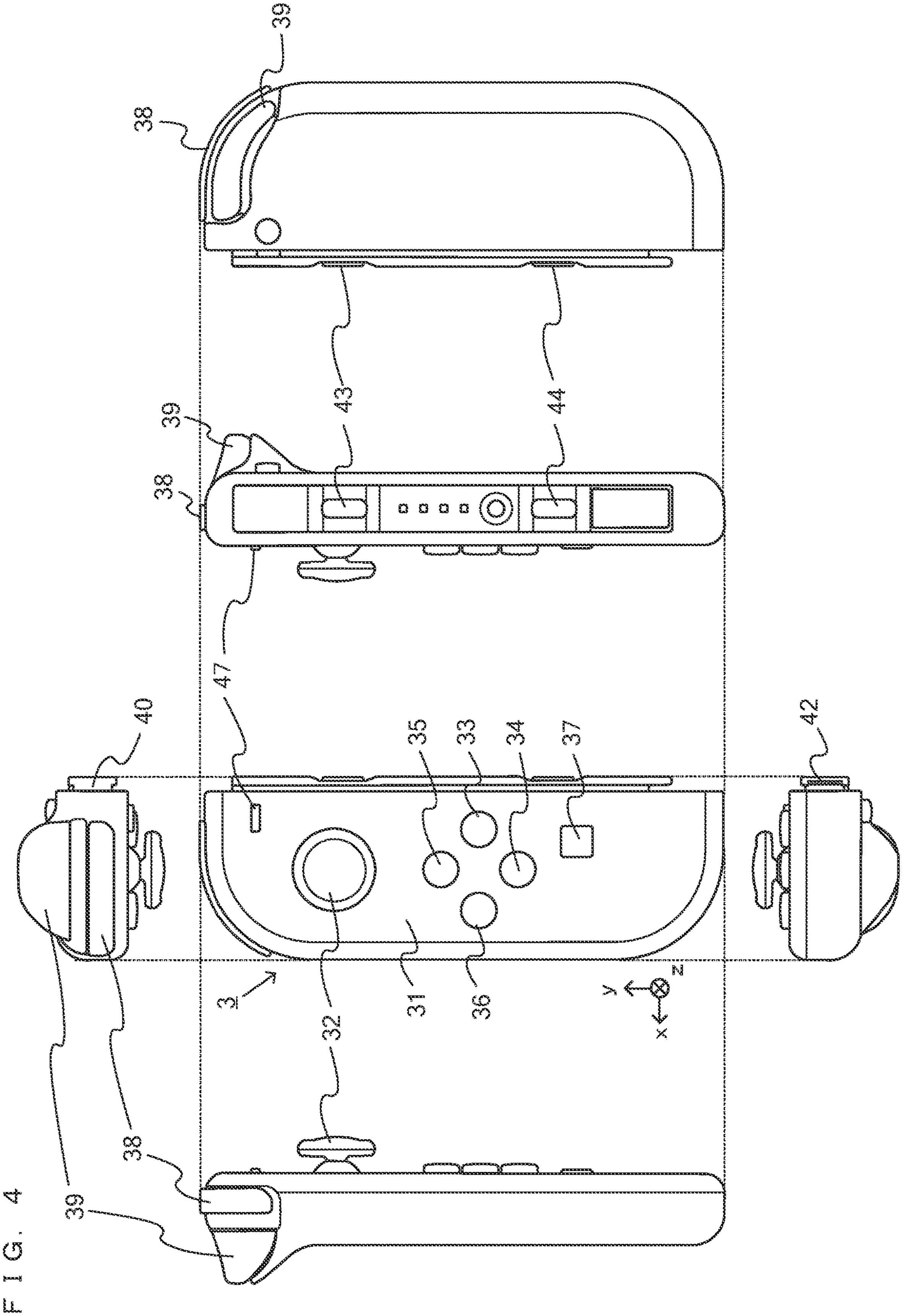
FIG. 4 illustrates six orthogonal views of a non-limiting example of a left controller 3.

FIG. 4 illustrates six orthogonal views of an example of the left controller 3. As illustrated in FIG. 4, the left controller 3 includes a housing 31. In the present example, the housing 31 has a vertically long shape, e.g., is shaped to be long in an up-down direction (i.e., a y-axis direction illustrated in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
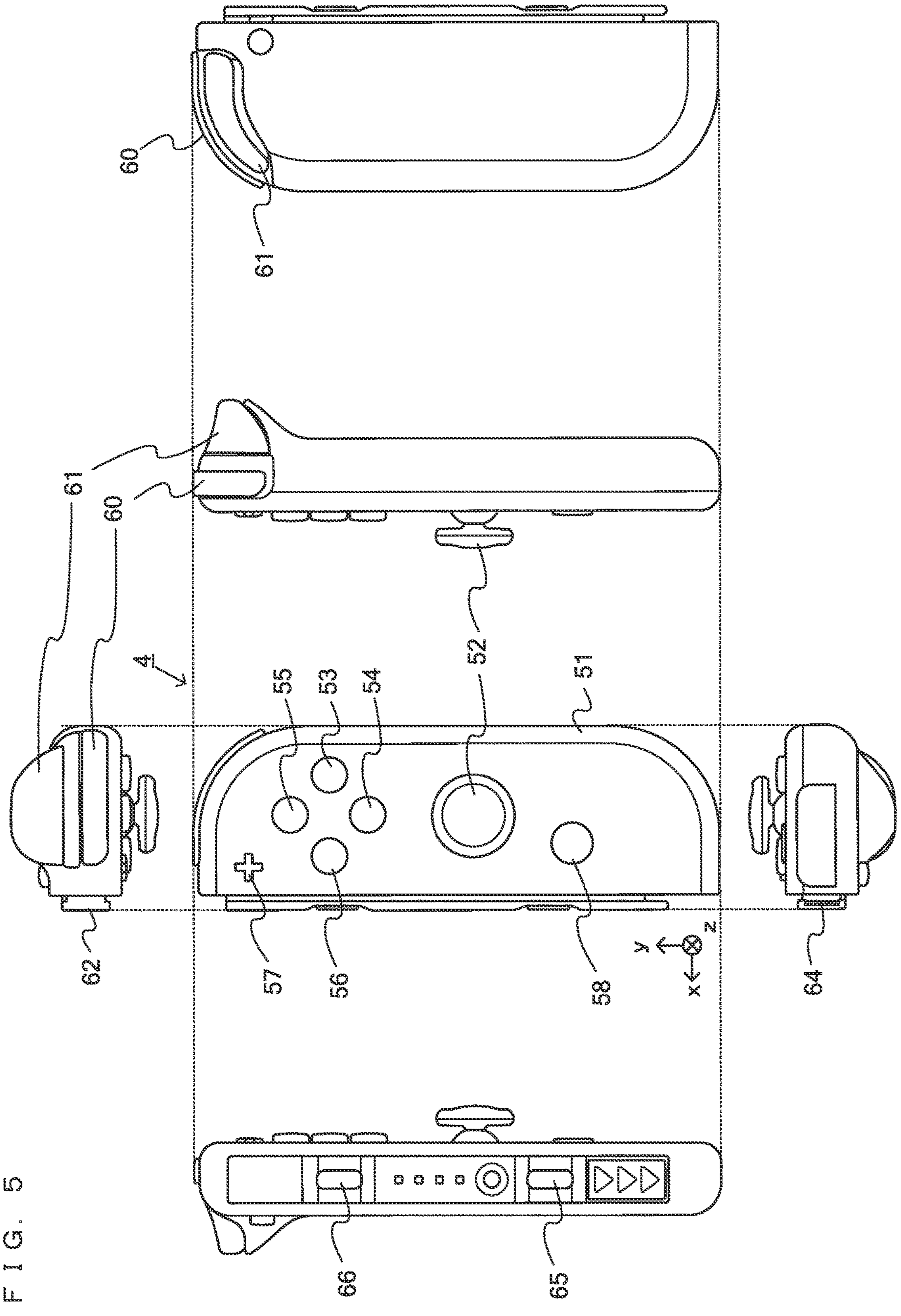
FIG. 5 illustrates six orthogonal views of a non-limiting example of a right controller 4.

FIG. 5 illustrates six orthogonal views of an example of the right controller 4. As illustrated in FIG. 5, the right controller 4 includes a housing 51. In the present example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
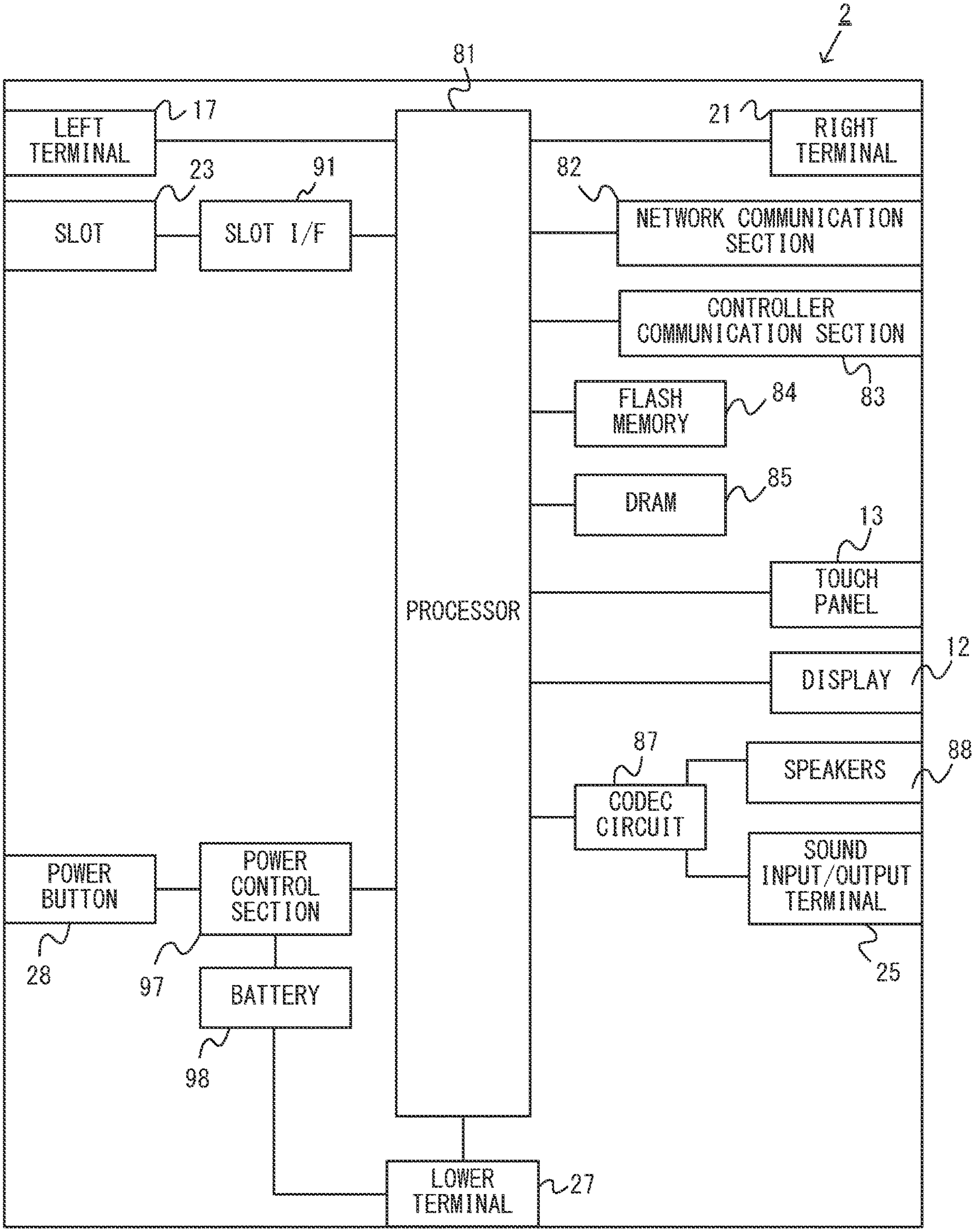
FIG. 6 is a block diagram illustrating a non-limiting example of an internal configuration of a main body apparatus 2.

FIG. 6 is a block diagram illustrating an example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication", in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As an example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
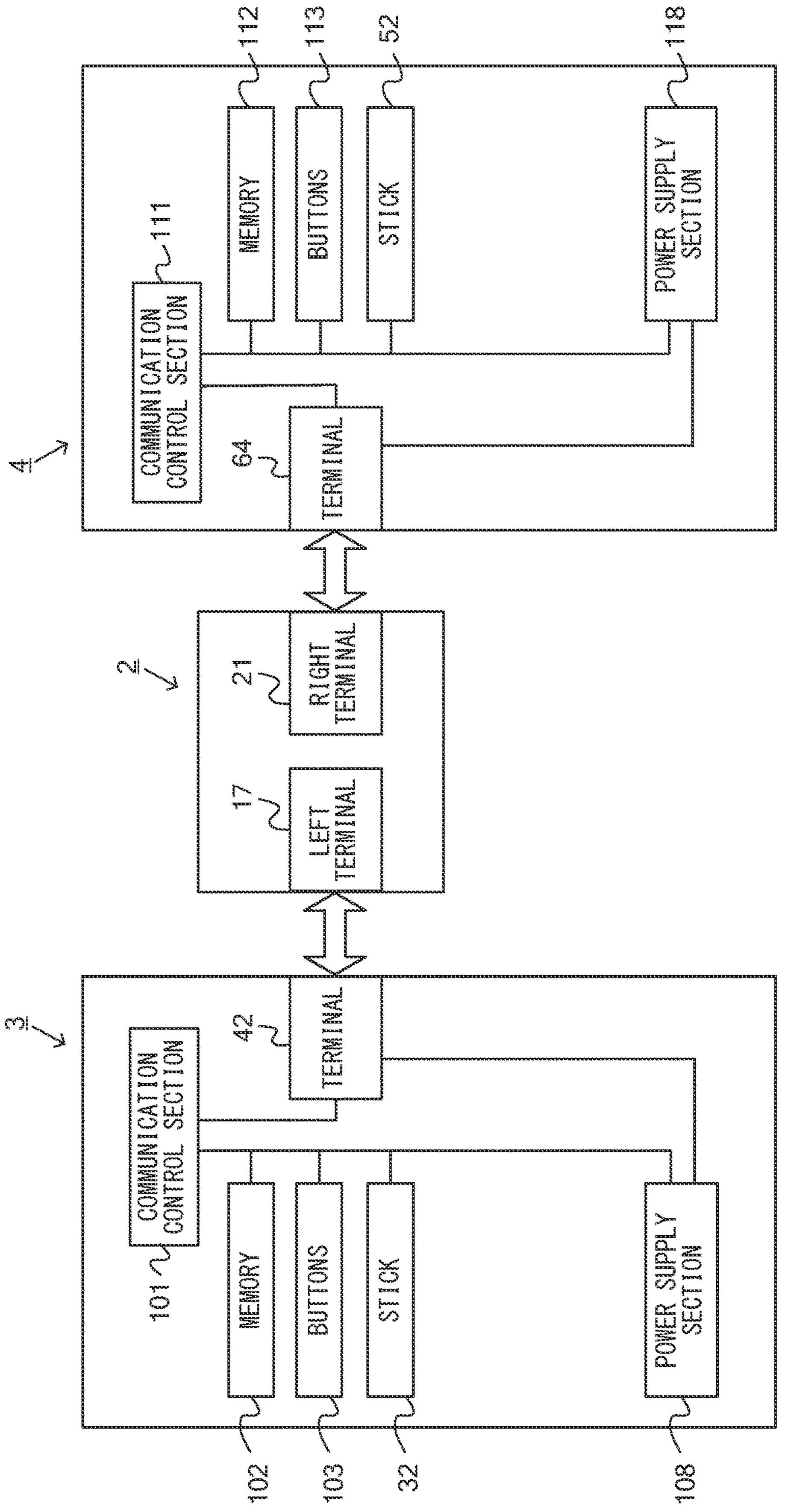
FIG. 7 is a block diagram illustrating non-limiting examples of internal configurations of a main body apparatus 2, a left controller 3, and a right controller 4.

FIG. 7 is a block diagram illustrating examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to an embodiment in which an image is displayed on the display 12. It should be noted that in the case in which the game system 1 is used in an embodiment in which an image is displayed on the display 12, the game system 1 may be used with the left controller 3 and the right controller 4 attached to the main body apparatus 2 (e.g., the main body apparatus 2, the left controller 3, and the right controller 4 are integrated in a single housing).

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present example, as an example, a game can be played in which a player character PC is moved in a virtual space according to the user's operation performed using the operation buttons, the sticks, and the touch panel 13.

Figure 8:
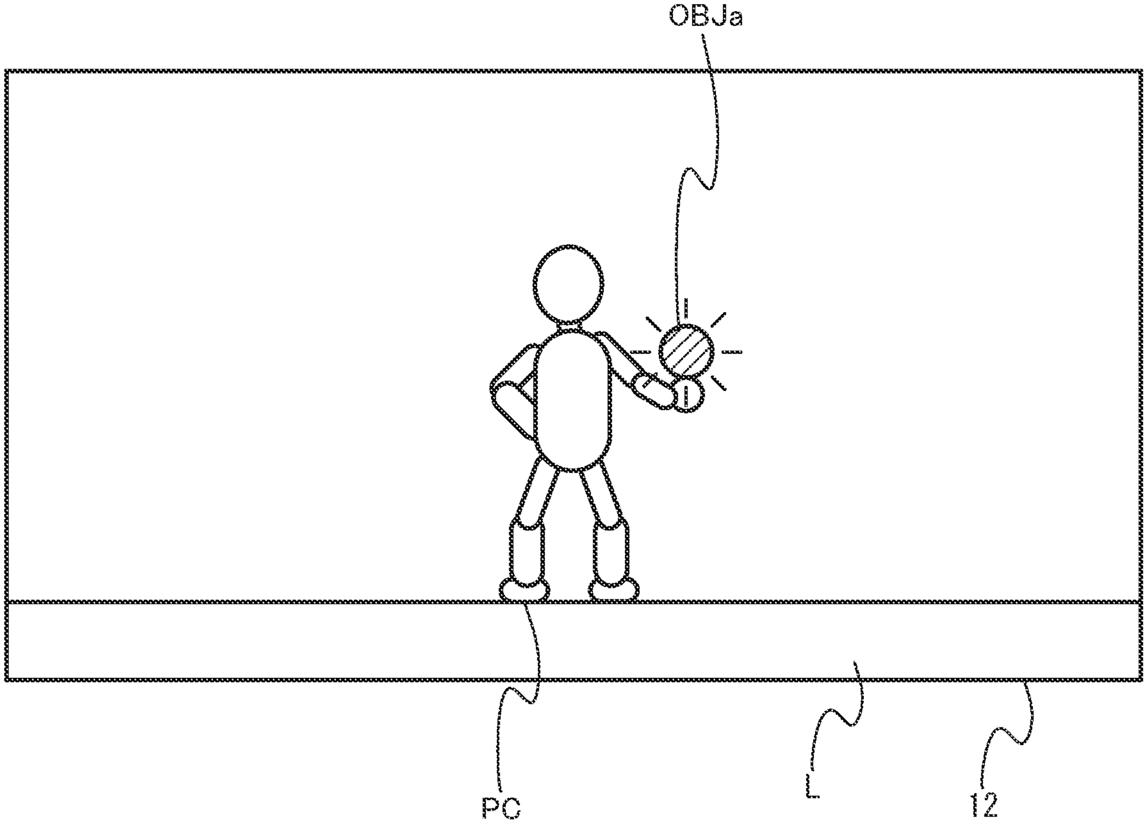
FIG. 8 is a diagram illustrating a non-limiting example of a game image of a player character PC having a first item object OBJa in a virtual space.
Figure 9:
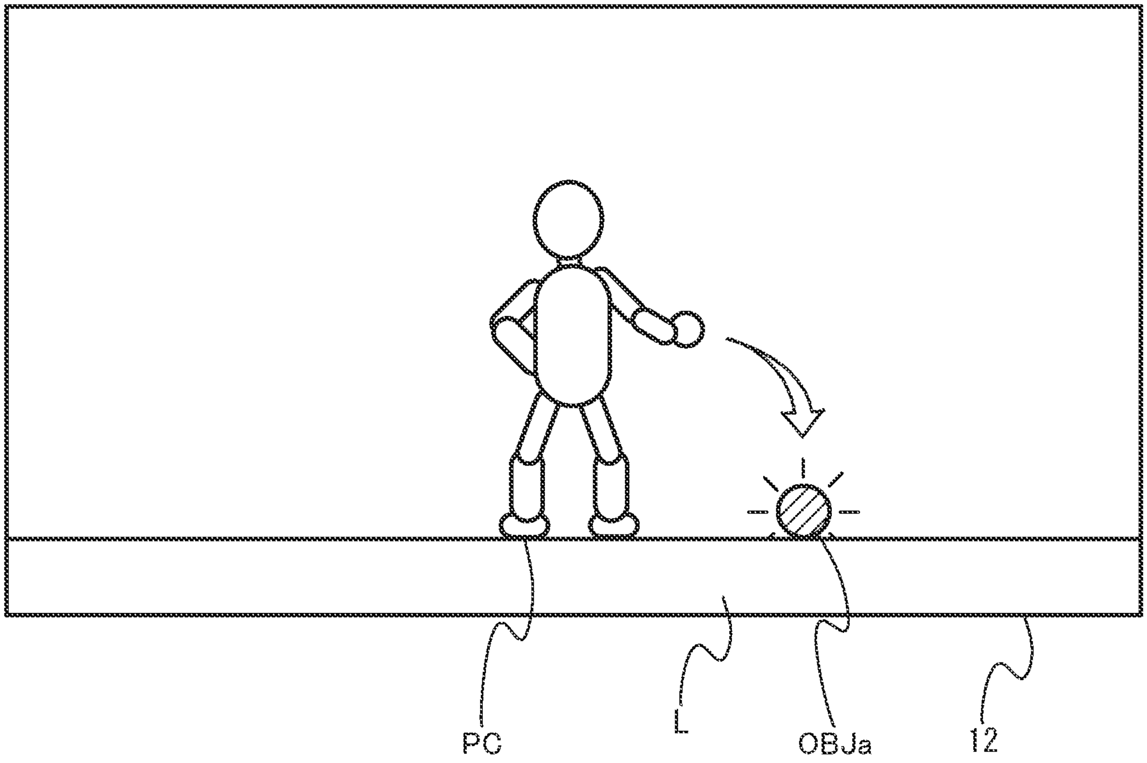
FIG. 9 is a diagram illustrating a non-limiting example of a game image showing that a first item object OBJa has dropped and is located near a player character PC's feet.
Figure 10:
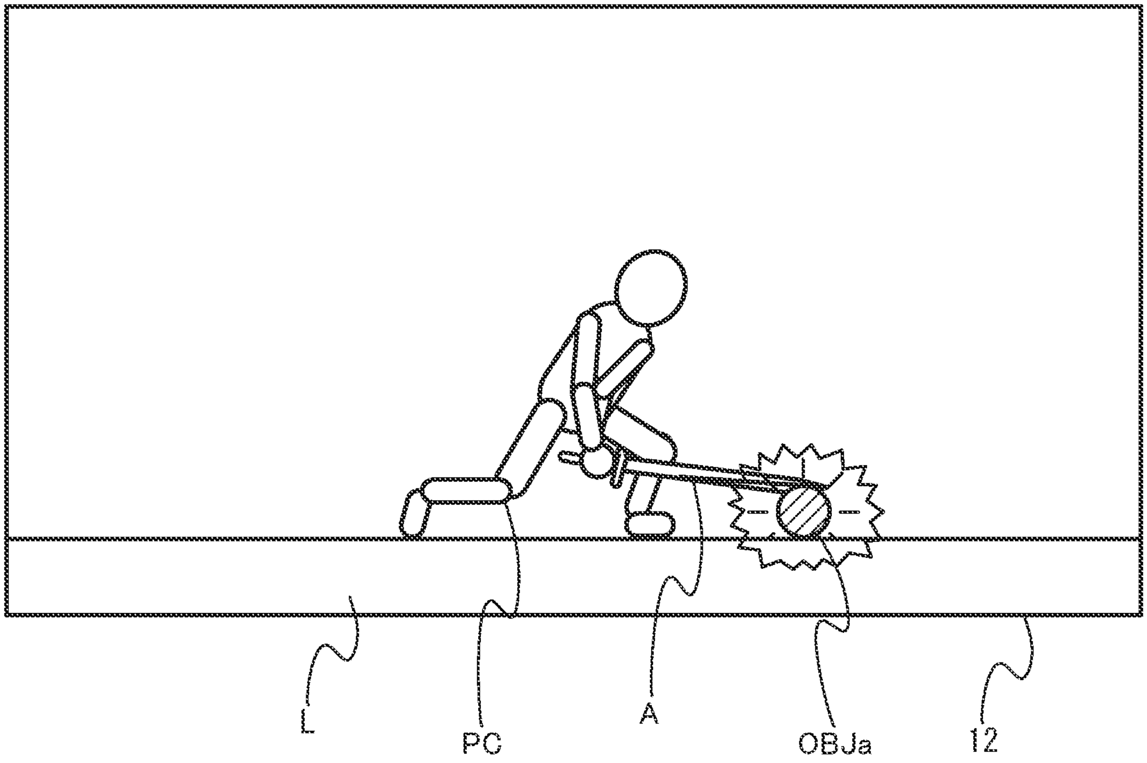
FIG. 10 is a diagram illustrating a non-limiting example of a game image showing that a player character PC is applying an impact on a first item object OBJa near the feet by a proximity attack action of swinging an equipment object A.
Figure 11:
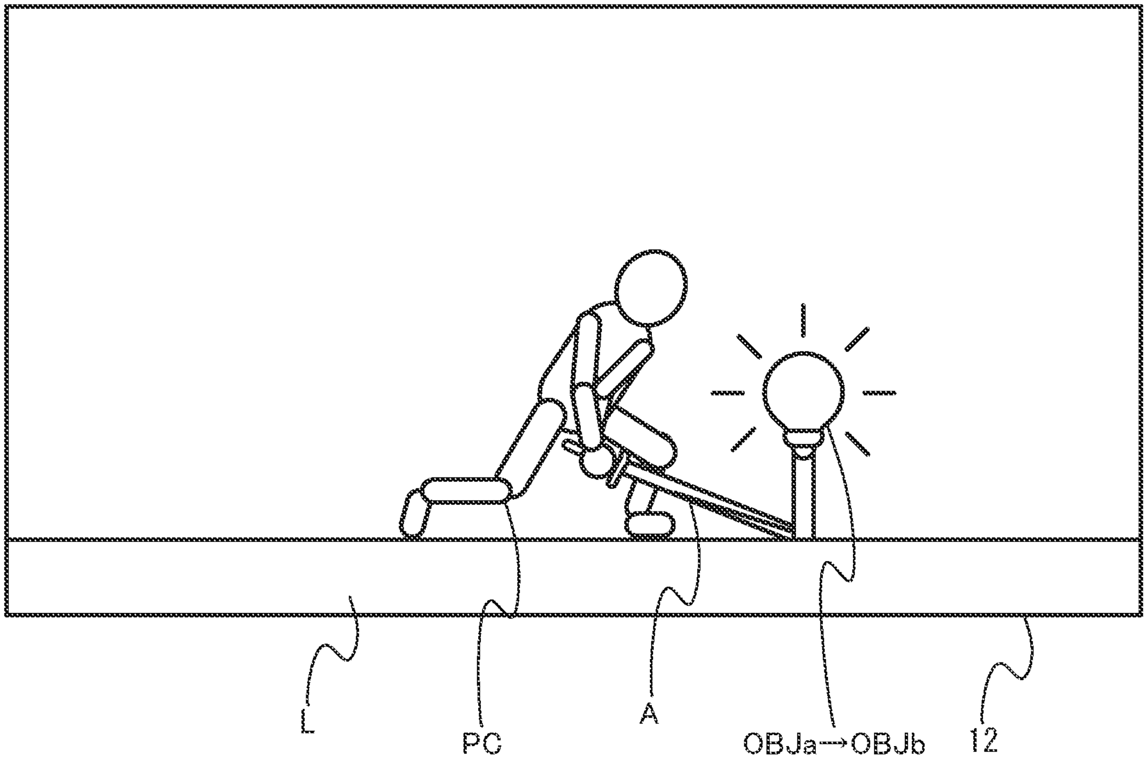
FIG. 11 is a diagram illustrating a non-limiting example of a game image showing that a second item object OBJb is installed on a terrain object L by a proximity attack action of swinging an equipment object A.

A first example game process executed in the game system 1 will be outlined with reference to FIGS. 8 to 11. It should be noted that FIG. 8 is a diagram illustrating an example of a game image of a player character PC having a first item object OBJa in the virtual space. FIG. 9 is a diagram illustrating an example of a game image showing that the first item object OBJa has dropped and is located near the player character PC's feet. FIG. 10 is a diagram illustrating an example of a game image showing that the player character PC is applying an impact on the first item object OBJa near the feet by a proximity attack action of swinging an equipment object A. FIG. 11 is a diagram illustrating an example of a game image showing that a second item object OBJb is installed on a game field (terrain object L) by the proximity attack action of swinging the equipment object A.

FIG. 8 illustrates an image in which the player character PC is located in the underground field of the virtual space. The player character PC is allowed to move in at least a ground field in the virtual space, an underground field below the ground field, and an airspace field above the ground field, based on the user's movement operation input. It should be noted that in the present example, for the sake of convenience, an airspace field is defined as an extent of space located higher than or equal to a predetermined height in a virtual space, a ground field is defined as a ground and an extent of space located lower than a predetermined height above the ground in the virtual space, and an underground field is defined as a space below the ground. It should be noted that the fields may not actually be separated in the virtual space.

When a light source is not set in the underground field, the underground field is a dark space. However, in the figures of the present example, the player character PC and various virtual objects in the underground field are visible while the darkness of the underground field is not expressed, for the sake of convenience. In addition, although in the present example, a game image is displayed on the display 12 of the main body apparatus 2, a game image may be displayed on other display devices connected to the main body apparatus 2

In FIG. 8, the player character PC is located in the underground field, holding the first item object OBJa with a hand. The first item object OBJa can be acquired on the ground field or the underground field by the player character PC performing a predetermined acquisition action (e.g., an action of picking up the first item object OBJa on a field), and can then be contained in the player character PC. Here, a state in which the player character PC contains the first item object OBJa refers to a state in which an object such as the first item object OBJa can be carried by the player character PC without the object being attached, held, or the like. At this time, the first item object OBJa may not be displayed in a game field. The contained first item object OBJa can be disposed in a game field or used (including attached or held) according to the user's operation input, basically depending on a situation. As an example, for example, the first item object OBJa is put in a pouch or an item box, so that the first item object OBJa is contained. It should be noted that such a container may not be displayed. In addition, a container such as a pouch or an item box may not exist in a game field, and instead, only the function of containing the first item object OBJa may exist.

It should be noted that the first item object OBJa may be previously disposed on a game field (terrain object L) at the start of a game. Alternatively, the first item object OBJa may be disposed as an opponent character has dropped the object or an opponent character has been beaten. The first item object OBJa may be acquired from an object that is not an item object.

The first item object OBJa may emit weak light in the underground field. For example, the first item object OBJa emits light that allows the first item object OBJa to be visually recognized even in a dark underground field, in a displayed game image. As an example, for the first item object OBJa, a post-effect of emitting light weaker than that of a point light source or emission may be set. It should be noted that in FIG. 8, light emission of the first item object OBJa is represented by effect lines.

In FIG. 9, the player character PC performs an action of dropping the first item object OBJa from the hand to near the feet, according to the user's action instruction. As a result, in the underground field, the first item object OBJa is disposed on the terrain object L, which forms an underground surface which the player character PC is in contact with. It should be noted that if the first item object OBJa satisfies a predetermined installation condition, the first item object OBJa is altered into a second item object OBJb, which is then installed and fixed to the terrain object L, as described below. However, in the state illustrated in FIG. 9, the above installation condition is not satisfied, and therefore, the first item object OBJa is placed without alteration on the terrain object L, which state is referred to as a non-installation state.

The player character PC is allowed to perform an action of attacking other characters and virtual objects (e.g., an opponent character) according to the user's operation. As an example, control to cause the player character PC to perform an attack action using a weapon can be performed according to the user's operation. In the present example, an equipment object, a combination equipment object, and the like are prepared as weapons that are used when the player character PC performs an attack action. The player character PC is allowed to be equipped with any of equipment objects and combination equipment objects, and is also allowed to perform an attack action using an equipment object according to the user's operation, and perform an attack action using a combination equipment object according to the user's operation.

In FIG. 10, the player character PC is holding an equipment object A that is an example of a weapon that the player character PC is allowed to be equipped with, and is performing an action of attacking the first item object OBJa placed on the terrain object L using the equipment object A. For example, when the player character PC is holding the equipment object A, the player character PC performs an action of swinging the equipment object A down according to the user's action instruction (this causes damage to an object to be attacked). When the first item object OBJa is located in a range in which the first item object OBJa is affected by the player character PC's attack action, the equipment object A hits the first item object OBJa, so that an impact is applied to the first item object OBJa.

It should be noted that the player character PC is allowed to be equipped with a plurality of equipment objects. Here, in the present example, the player character PC may be allowed to be simultaneously equipped with short-range attack equipment objects such as a sword object and a spear object, long-range attack equipment objects such as a bow and arrow object, defensive equipment objects such as a shield object, and the like. In this case, the player character PC is allowed to perform an attack action while holding one of equipment objects with which the player character PC is equipped. Specifically, according to the user's action instruction to choose an equipment object and adopt a holding position, the player character PC is caused to adopt a position to hold the chosen equipment object. In addition, according to the user's action instruction, the player character PC is caused to perform an attack action using the equipment object. It should be noted that in another example, the number of equipment objects with which the player character PC is allowed to be simultaneously equipped may be one. Although in the present example, an attack action is performed with the player character PC equipped with an equipment object, the player character PC's actions such as hitting, kicking, and gripping may be an attack action.

Figure 16:
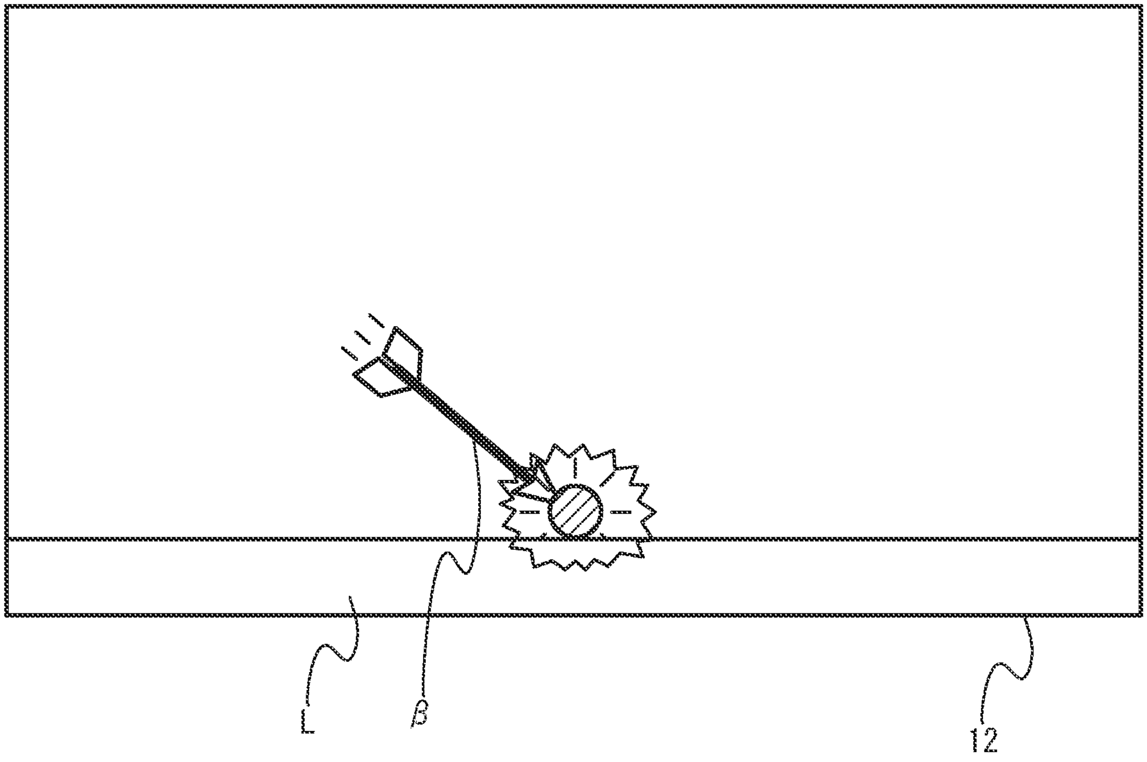
FIG. 16 is a diagram illustrating a non-limiting example of a game image showing that a combination equipment object (3 sticks into a terrain object, so that an impact is applied to a first item object OBJa included in the combination equipment object β.

When it is determined that an impact has been applied to the first item object OBJa in the virtual space due to the player character PC's attack action, the first item object OBJa satisfies the installation condition. As illustrated in FIG. 16, when the first item object OBJa satisfies the installation condition, the first item object OBJa is altered into the second item object OBJb, which is then installed and fixed to the terrain object L.

The second item object OBJb is different from the first item object OBJa. The appearance and performance of the second item object OBJb may also be different from those of the first item object OBJa. The second item object OBJb emits light stronger than that of the first item object OBJa in the underground field. Light emitted by the second item object OBJb sets lighting such that a predetermined range of the underground field around the location where the second item object OBJb is installed is lighter than before the second item object OBJb is installed. As an example, for the second item object OBJb, a point light source or surface light source is set which emits light stronger than that of the first item object OBJa. When the second item object OBJb is installed on the terrain object L, the second item object OBJb continues to emit the above light in the installation state, and therefore, the user can recognize a state of the underground field around the installation location.

Figure 12:
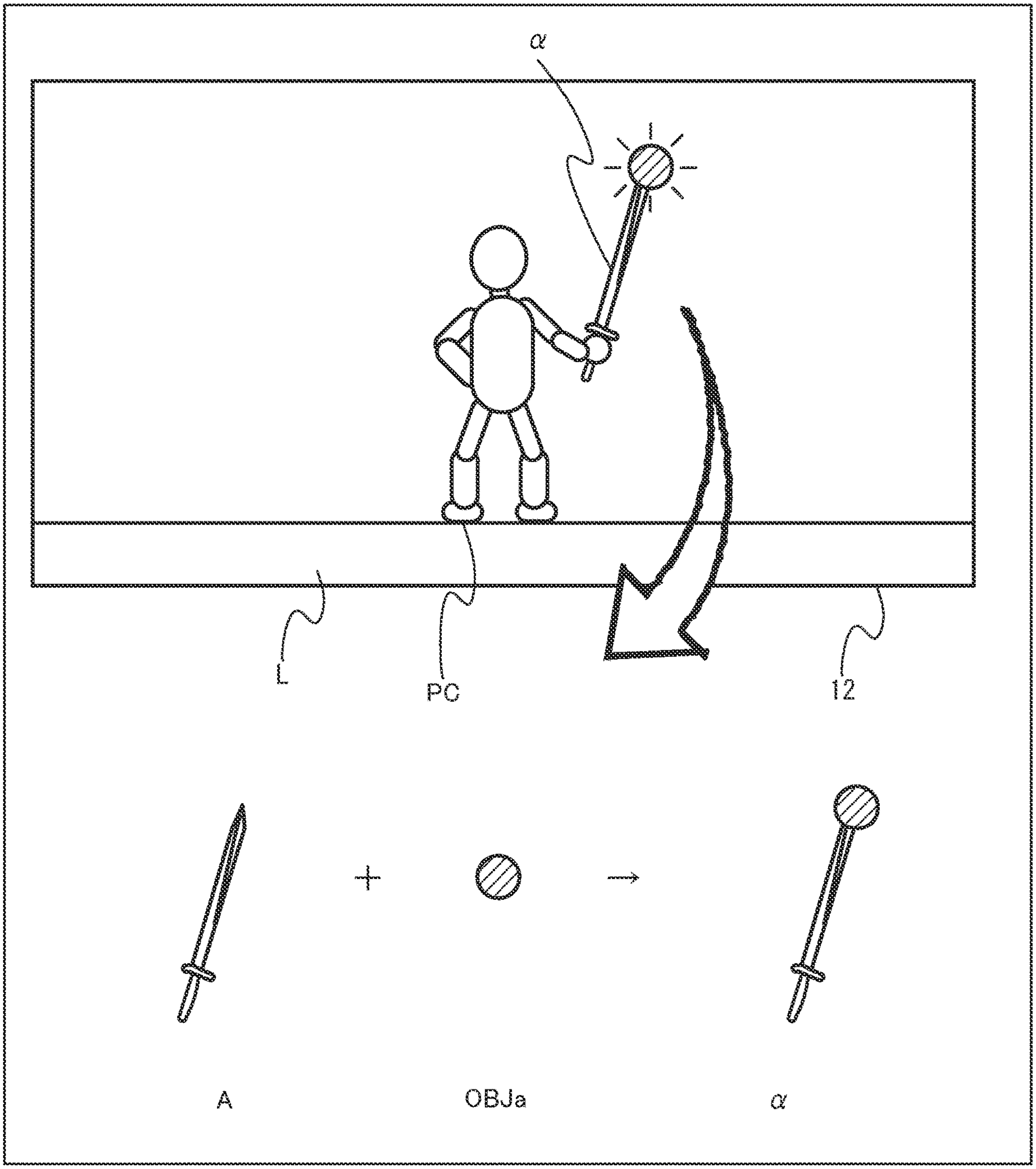
FIG. 12 is a diagram illustrating a non-limiting example of a game image showing that a player character PC synthesizes a combination equipment object α in a virtual space.
Figure 13:
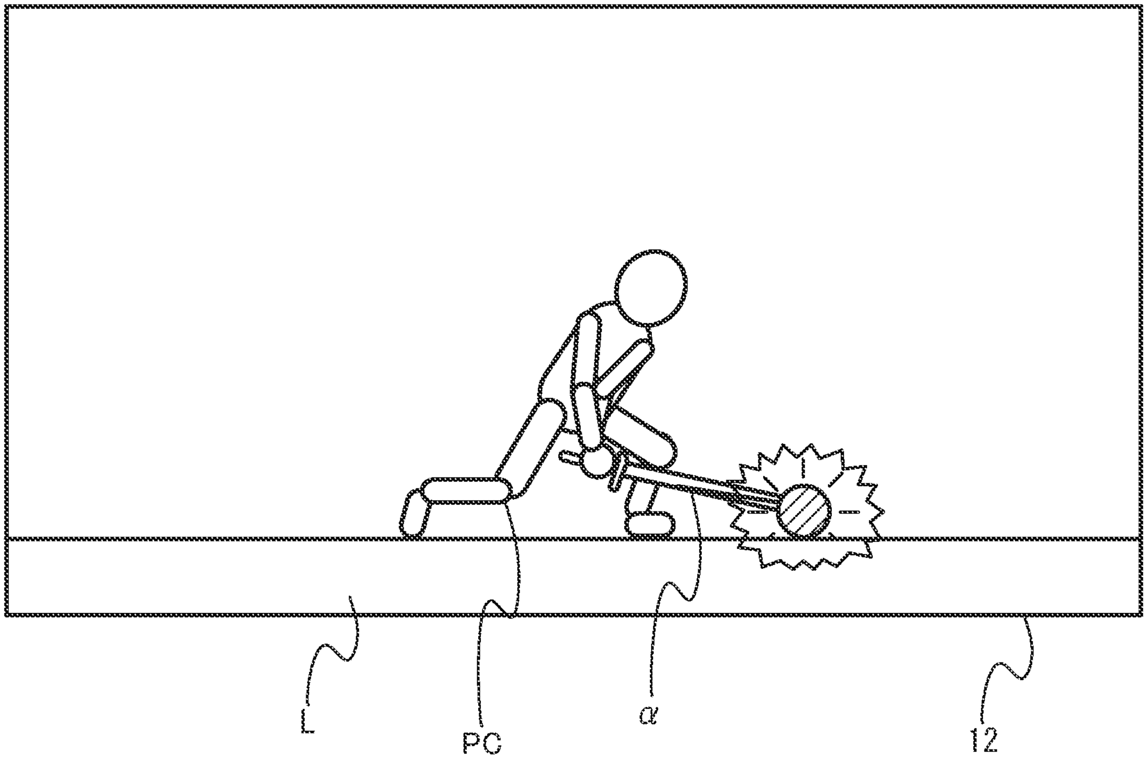
FIG. 13 is a diagram illustrating a non-limiting example of a game image showing that a player character PC is applying an impact on a first item object OBJa included in a combination equipment object α by a proximity attack action of swinging the combination equipment object α.
Figure 14:
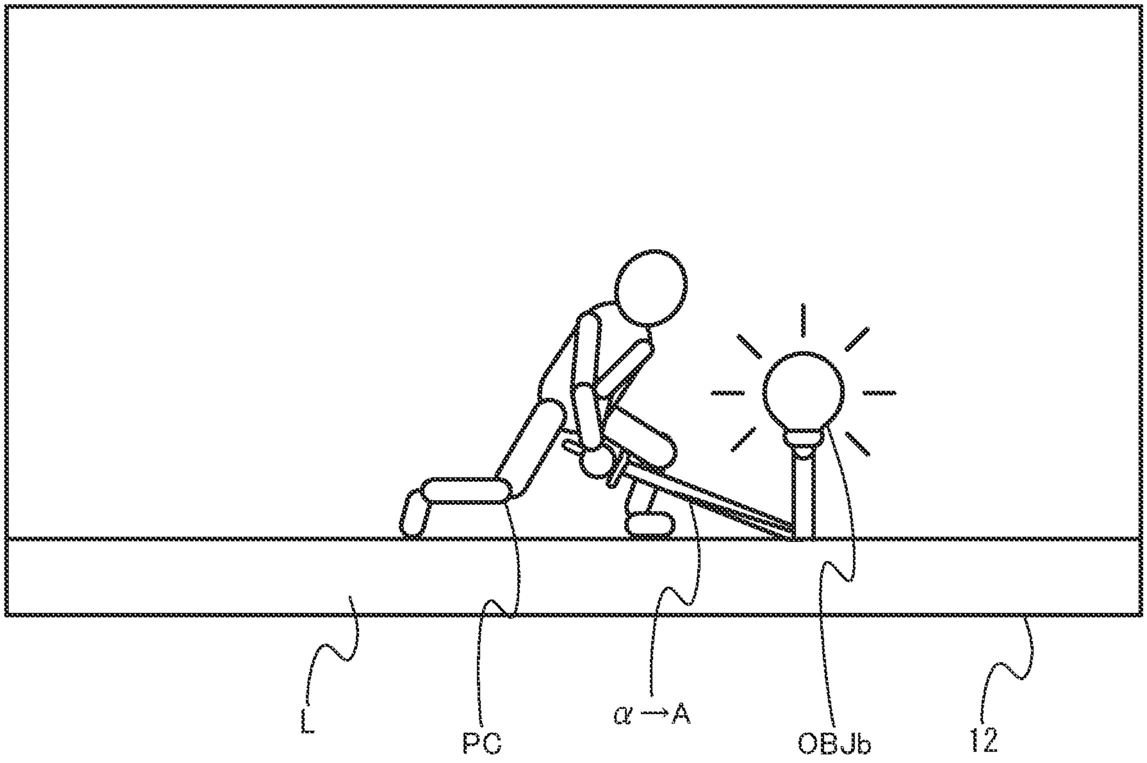
FIG. 14 is a diagram illustrating a non-limiting example of a game image showing that a second item object OBJb is installed on a terrain object due to a player character PC's proximity attack action of swinging a combination equipment object α.

A second example game process executed in the game system 1 will be outlined with reference to FIGS. 12 to 14. It should be noted that FIG. 12 is a diagram illustrating an example of a game image showing that a player character PC synthesizes a combination equipment object α in the virtual space. FIG. 13 is a diagram illustrating an example of a game image showing that the player character PC is applying an impact on a first item object OBJa included in the combination equipment object α by a proximity attack action of swinging the combination equipment object α. FIG. 14 is a diagram illustrating an example of a game image showing that a second item object OBJb is installed on the terrain object L due to the player character PC's proximity attack action of swinging the combination equipment object α.

In FIG. 12, the player character PC is holding the combination equipment object α, which is an example of a weapon with which the player character PC is equipped. The combination equipment object α is synthesized by combining an equipment object A (sword object) with the first item object OBJa. The combination equipment object α includes the first item object OBJa, which can be altered into the second item object OBJb, which emits light. Therefore, when the user causes the player character PC to perform an attack action, the combination equipment object α can exhibit a function of installing the second item object OBJb on a target object. In addition, when the user causes the player character PC to perform an attack action, the combination equipment object α exhibits a basic attack function by an attack action of swinging a sword object, i.e., "slashing another object when contacting that object". For example, when the combination equipment object α is swung, so that the blade thereof is brought into direct contact with an opponent character, the opponent character can be slashed to suffer predetermined damage.

In the present example, the combination equipment object α is synthesized by combining and integrating the equipment object A, which is possessed by the player character PC, with the first item object OBJa. For example, the user can produce the combination equipment object α by providing an item use instruction to choose the first item object OBJa as an item object to be combined with the equipment object A, and combine the first item object OBJa with the equipment object A (in other words, an instruction to integrate the equipment object A with the first item object OBJa).

As illustrated in FIG. 12, the combination equipment object α has an appearance in which the first item object OBJa is combined at a tip end portion of the equipment object A (in other words, a tip end portion of the equipment object A is replaced with the first item object OBJa, so that the equipment object A and the first item object OBJa are integrated together). Thus, in the present example, a combination equipment object (e.g., the combination equipment object α) has an appearance including at least a portion of the appearance of an equipment object (e.g., the equipment object A) that is a member of the combination equipment object, and at least a portion of the appearance of an item object (e.g., the first item object OBJa) that is a member of the combination equipment object. As a result, the combination equipment object can give the user an impression that the combination equipment object is a combination of the equipment object and the item object.

It should be noted that a portion of an equipment object at which an item object is combined may be set according to the combination of the item object and the equipment object. For example, when a shield object, which is a defensive equipment object, is combined with an item object, an appearance may be provided in which the item object is combined at a center portion or outer frame portion of the shield object.

In addition, in the example of FIG. 12, the appearance of the combination equipment object is obtained by combining the equipment object A, which is a member of the combination equipment object, with the first item object OBJa, which is a member of the combination equipment object, by replacing a portion of the appearance of the equipment object A with the entirety of the appearance of the first item object OBJa. It should be noted that the appearance of a combination equipment object may be obtained by combining the appearance of an equipment object, which is a member of the combination equipment object, with an item object, which is a member of the combination equipment object, by replacing a portion of the appearance of the equipment object with a portion of the appearance of the item object. Alternatively, the appearance of a combination equipment object may be obtained by combining the entirety of the appearance of an equipment object, which is a member of the combination equipment object, with the entirety or a portion of the appearance of an item object, which is a member of the combination equipment object.

In FIG. 13, the player character PC is performing an attack action of swinging down the combination equipment object α, which is an example of a weapon with which the player character PC is allowed to be equipped, toward the terrain object L near the player character PC's feet. When the combination equipment object α hits the terrain object L due to the player character PC's attack action, an impact is applied to the first item object OBJa, which included in the combination equipment object α, due to the attack.

When it is determined that the combination equipment object α has hit the terrain object L in the virtual space due to the player character PC's proximity attack action, so that an impact has been applied to the first item object OBJa, which is included in the combination equipment object α, the first item object OBJa satisfies the installation condition. As illustrated in FIG. 14, when the first item object OBJa, which is included in the combination equipment object α, satisfies the installation condition, the first item object OBJa is altered into the second item object OBJb, which is the installed and fixed to the site of the terrain object L hit by the combination equipment object α. The second item object OBJb, which is installed when the combination equipment object α hits the terrain object L, has the same function as that of the second item object OBJb set in the above first example game process.

Here, when the first item object OBJa, which is included in the combination equipment object α, is altered into the second item object OBJb, which is then installed on the terrain object L, the combination equipment object α is altered back into the original equipment object A. Thus, the combination equipment object α serves as a tool for installing the second item object OBJb in the underground field, and after exhibiting that function, can be used as the original equipment object A, which does not have that function.

Figure 15:
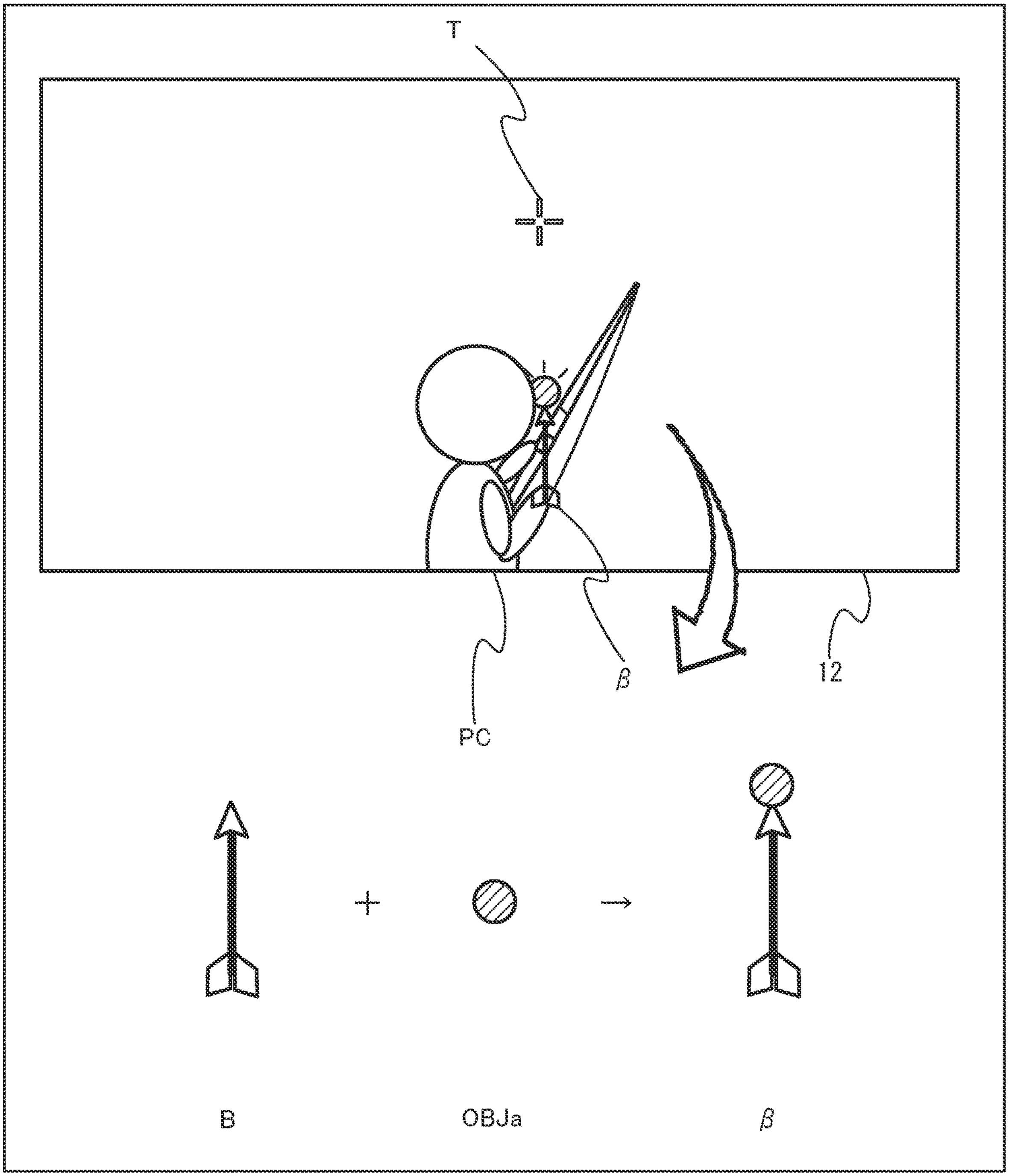
FIG. 15 is a diagram illustrating a non-limiting example of a game image showing that a player character PC performs a long-range attack action using a combination equipment object β.
Figure 17:
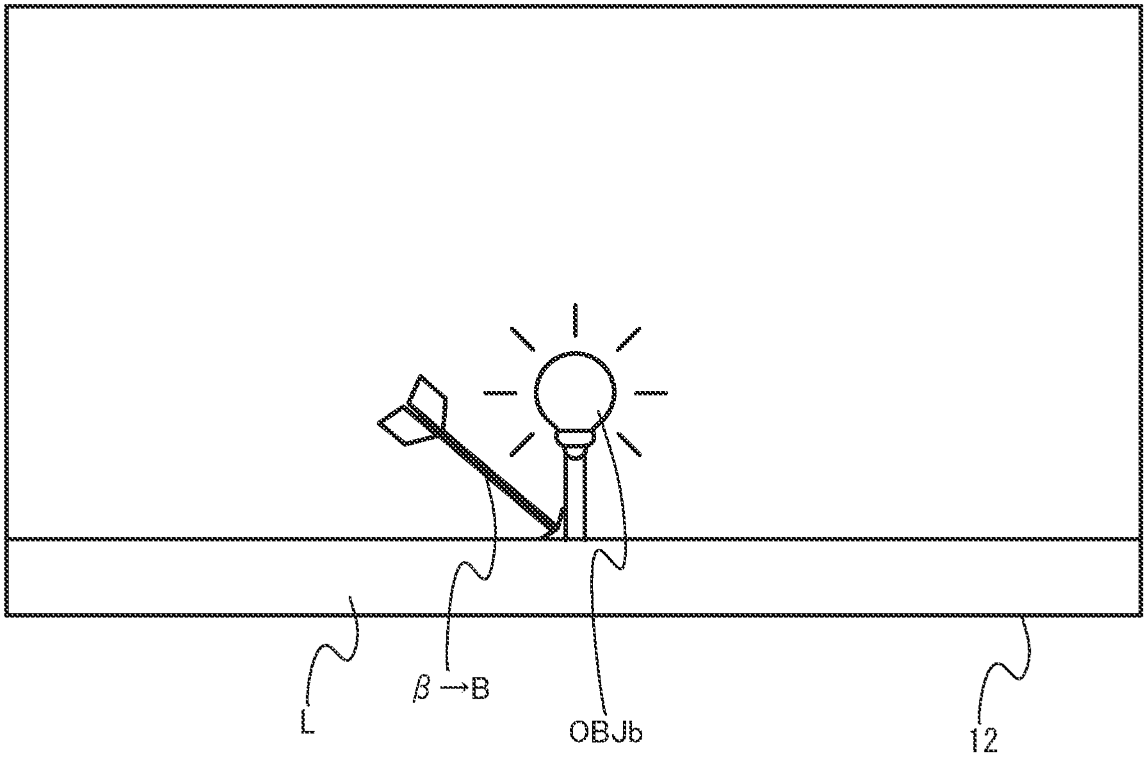
FIG. 17 is a diagram illustrating a non-limiting example of a game image showing that a second item object OBJb is installed on a terrain object due to a long-range attack action of launching a combination equipment object β.

A third example game process executed in the game system 1 will be outlined with reference to FIGS. 15 to 17. It should be noted that FIG. 15 is a diagram illustrating an example of a game image showing that a player character PC performs a long-range attack action using a combination equipment object β. FIG. 16 is a diagram illustrating an example of a game image showing that the combination equipment object β sticks into the terrain object L, so that an impact is applied to a first item object OBJa included in the combination equipment object β. FIG. 17 is a diagram illustrating an example of a game image showing that a second item object OBJb is installed on a terrain object L due to the long-range attack action of launching the combination equipment object β.

In FIG. 15, the player character PC is holding the combination equipment object β, which is an example of a weapon with which the player character PC is equipped. The combination equipment object β is synthesized by combining an equipment object B (a bow and arrow object; specifically, an arrow object) with the first item object OBJa. The combination equipment object β includes the first item object OBJa, which can be altered into the second item object OBJb, which emits light. Therefore, when the user causes the player character PC to perform an attack action, the combination equipment object β can exhibit a function of installing the second item object OBJb on a target object. In addition, when the user causes the player character PC to perform an attack action, the combination equipment object β exhibits a basic attack function by an attack action of launching an arrow object, i.e., "shooting an arrow object at another object". For example, when an arrow object launched using the combination equipment object β sticks into an opponent character, the opponent character can suffer predetermined damage due to the sticking.

In FIG. 15, the player character PC is holding the combination equipment object β, i.e., adopts a holding position after having made a nock in an arrow object (ready-to-shoot state). In addition, an aiming marker T is displayed which indicates a shooting direction of an arrow object that is taken when the arrow object is launched according to the user's shooting instruction. In the above ready-to-shoot state, the user is allowed to provide an instruction to change the shooting direction in addition to the above shooting instruction.

In the present example, the combination equipment object β is synthesized by combining and integrating the equipment object B, which is possessed by the player character PC, with the first item object OBJa. For example, in the above ready-to-shoot state, the user is allowed to synthesize the combination equipment object β by providing an item use instruction to combine the first item object OBJa chosen from the objects contained in the player character PC with an arrow object with which the player character PC is equipped (in other words, an instruction to integrate an arrow object included in the equipment object B with the first item object OBJa).

As illustrated in FIG. 15, the combination equipment object β has an appearance in which the first item object OBJa is combined at a tip end portion of an arrow object included in the equipment object B (in other words, a tip end portion of the arrow object is replaced with the first item object OBJa, so that the arrow object and the first item object OBJa are integrated together). Thus, in the present example, a combination equipment object (e.g., the combination equipment object β) has an appearance including at least a portion of the appearance of an equipment object (e.g., an arrow object included in the equipment object B), which is a member of the combination equipment object, and at least a portion of the appearance of an item object (e.g., the first item object OBJa), which is a member of the combination equipment object. It should be noted that when a bow and arrow object that is a long-range attack equipment object is combined with an item object, the resultant combination equipment object may have an appearance in which the item object is combined at the arrowhead portion, arrow nock portion, or arrow shaft portion of the arrow object included in the bow and arrow object.

In FIG. 16, the arrow object included in the combination equipment object β sticks into the terrain object L in the underground field after being launched by the player character PC's attack action. When the arrow object included in the combination equipment object β hits the terrain object L due to the player character PC's attack action, an impact is applied to the first item object OBJa, which is combined with the arrow object, due to the attack.

When it is determined that the arrow object has hit the terrain object L in the virtual space due to the player character PC's long-range attack action, so that an impact has been applied to the first item object OBJa, which is included in the combination equipment object β, the first item object OBJa satisfies the installation condition. As illustrated in FIG. 17, when the first item object OBJa, which is combined with the arrow object included in the combination equipment object β, satisfies the installation condition, the first item object OBJa is altered into the second item object OBJb, which is then installed and fixed to the site of the terrain object L hit by the arrow object. The second item object OBJb, which is installed when the allow object hits the terrain object L, has the same function as that of the second item object OBJb set in the above first example game process. Thus, by using an arrow object included in the combination equipment object β for attack, the player character PC can install the second item object OBJb at a distant location, so that a new light source is set at a target location toward which the player character PC moves, or surroundings of that location, which facilitates exploration to that location.

Here, when the first item object OBJa, which is combined with the arrow object, is altered into the second item object OBJb, which is then installed on the terrain object L, the combination equipment object β is altered back into the original equipment object B (i.e., an arrow object which is a member of the equipment object B is recovered). Thus, the combination equipment object β serves as a tool for installing the second item object OBJb at a distant location in the underground field, and after exhibiting that function, can be used as the original equipment object B, which does not have that function. It should be noted that the arrow object launched in the attack action may be removed from the virtual space when the arrow object stops flying by, for example, penetrating into an object to be attacked.

It should be noted that even when an arrow object combined with the first item object OBJa has failed to penetrate (e.g., not sticking, due to being repelled or the like), the second item object OBJb may be installed at a location that the arrow object has reached.

In addition, in the above third example game process, an arrow object included in the combination equipment object β is launched for long-range attack, for example. The second item object OBJb may be installed according to the player character PC's attack action of launching a combination equipment object in the virtual space in other fashions. For example, a combination equipment object including the first item object OBJa (e.g., a combination equipment object obtained by combining a stick object or a sword object with the first item object OBJa) may be launched in the virtual space by the player character PC performing an attack action by throwing or kicking the combination equipment object, so that the second item object OBJb is installed. Thus, even when the player character PC launches a combination equipment object including the first item object OBJa in the virtual space in other attack fashions, the second item object OBJb may be installed at a location distant from the player character PC where the combination equipment object has hit the terrain object L.

In addition, although in the above examples, a combination equipment object in which the first item object OBJa is combined with an equipment object is used by the player character PC in an attack action, the first item object OBJa may be used alone by the player character PC in an attack action. For example, the player character PC may be allowed to perform an attack action by throwing the first item object OBJa to hit an opponent character, in which case an attack can be achieved by using the first item object OBJa alone. In that case, even in the case in which the first item object OBJa is forbidden to move at a speed exceeding a first speed described below, then if it is determined that the first item object OBJa has hit another object due to the player character PC's attack action, or that the first item object OBJa is located in a range that is covered by the effect of the player character PC's attack action, it may be determined that the installation condition is satisfied, and therefore, the first item object OBJa is altered into the second item object OBJb, which is then installed.

In addition, in the present example, the second item object OBJb can be installed on the terrain object L, whose location cannot be changed, such as a ceiling, stone column, cliff surface, rock, tree, construction, cave, or the like. In another example, the second item object OBJb may be installed on other characters acting in the underground field and virtual objects whose locations can be changed. For example, in the case in which the second item object OBJb can be installed on other characters acting in the underground field (e.g., an opponent character), the second item object OBJb, into which the first item object OBJa has been altered, may be installed on another character by the player character PC's attack action using a combination equipment object including the first item object OBJa or the player character PC's attack action using the first item object OBJa alone. In that case, the player character PC's attack action may cause damage to an opponent character on which the second item object OBJb has been installed.

In addition, in another example, the second item object OBJb may be forbidden to be installed on other characters that perform an action in the underground field. As an example, when another character (e.g., an opponent character) that performs an action in the underground field is attacked by the player character PC's attack action using a combination equipment object including the first item object OBJa, that other character may be damaged, the second item object OBJb may not be installed on that other character, and the combination equipment object may be altered back into the original equipment object. As another example, when another character (e.g., an opponent character) that performs an action in the underground field is attacked by the player character PC's attack action using the first item object OBJa alone, that other character may be damaged, the second item object OBJb may not be installed on that other character, and the first item object OBJa may be removed.

In addition, when the first item object OBJa is located in a range that is covered by the effect of the player character PC's attack action, and an impact is applied to the first item object OBJa, the installation condition under which the first item object OBJa is altered into the second item object OBJb, which is then installed, is satisfied. In this case, as in the above first to third example game processes, the first item object OBJa may be either an offensive object (the second and third example game processes) or a defensive object (the first example game process) in the player character PC's attack action.

Figure 18:
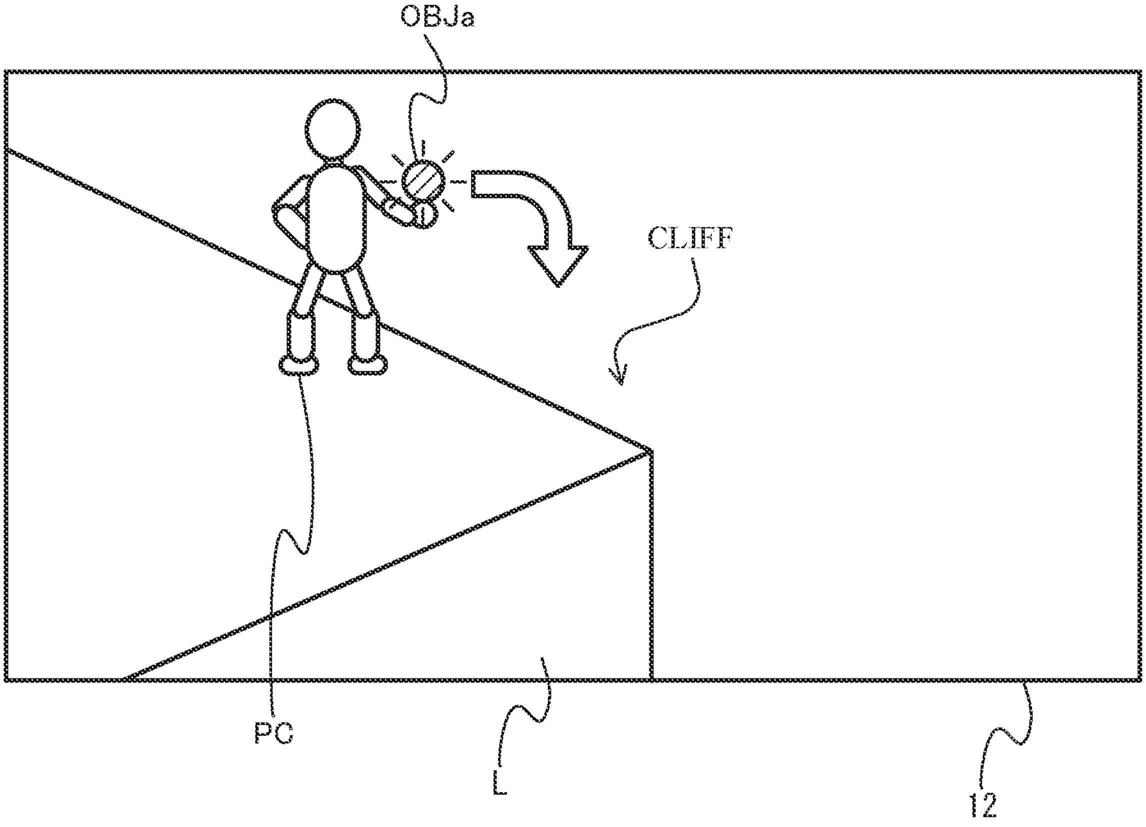
FIG. 18 is a diagram illustrating a non-limiting example of a game image showing that a player character PC drops a first item object OBJa from a cliff top.
Figure 19:
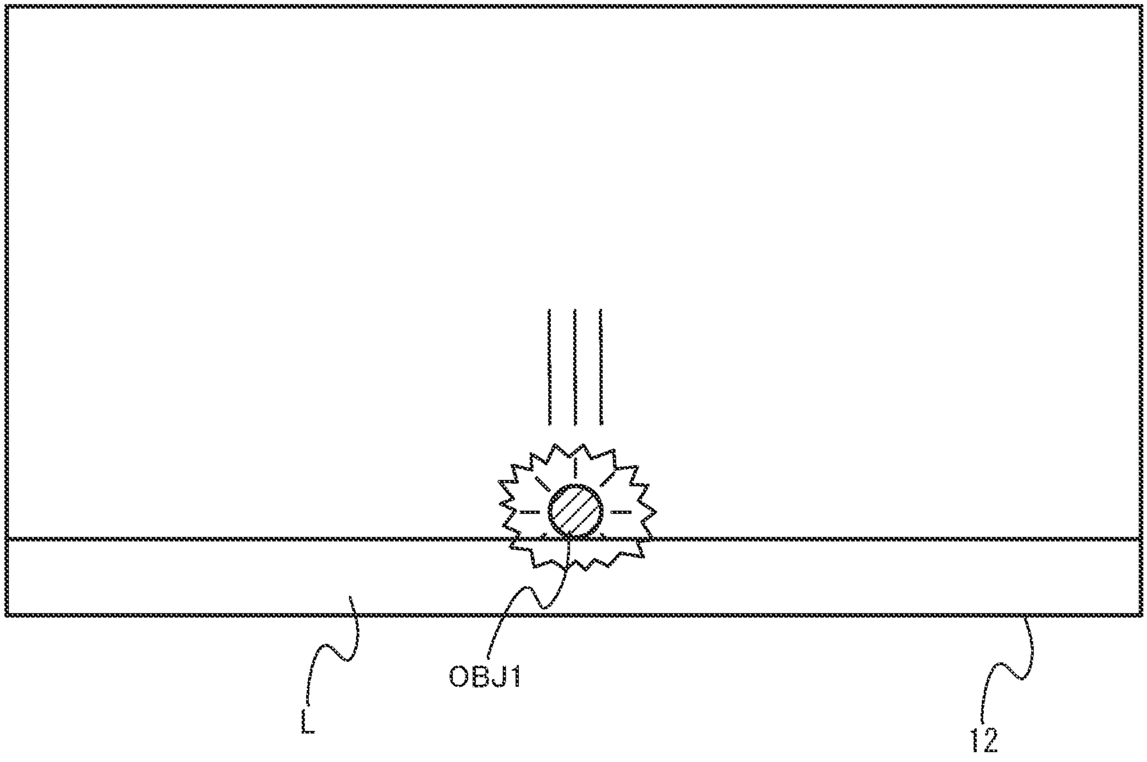
FIG. 19 is a diagram illustrating a non-limiting example of a game image showing that a first item object OBJa falls at a speed exceeding a first speed, so that an impact is applied on the first item object OBJa.
Figure 20:
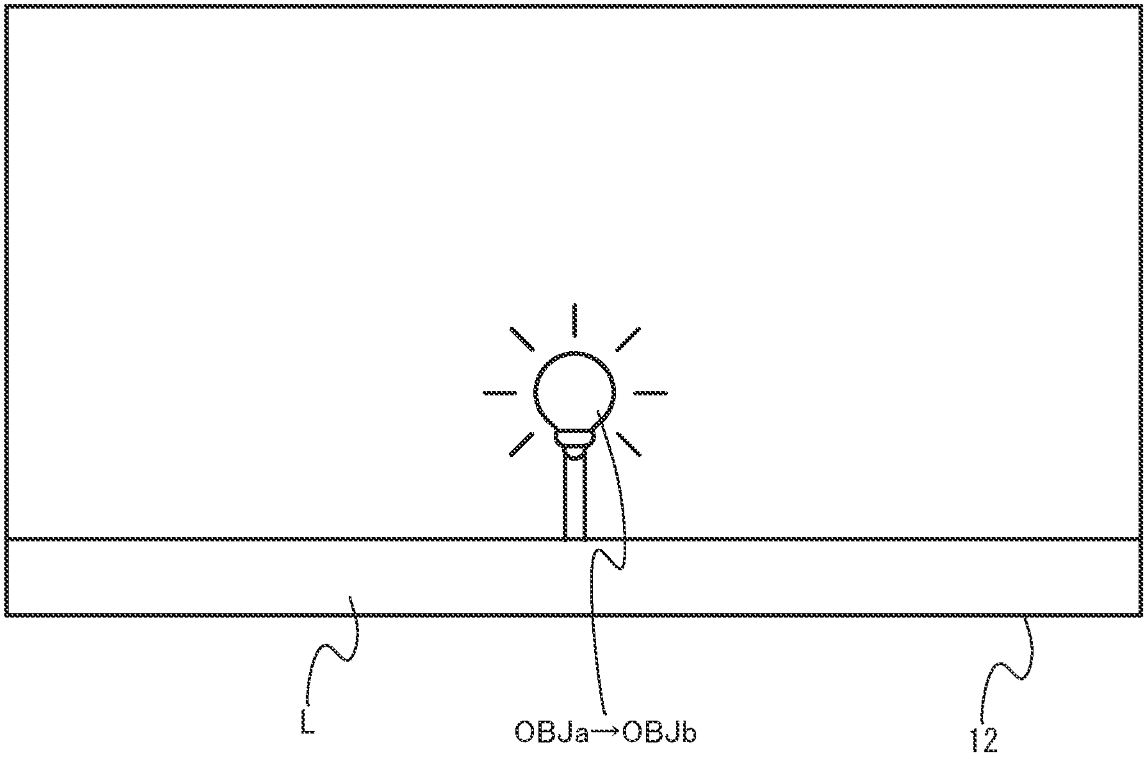
FIG. 20 is a diagram illustrating a non-limiting example of a game image showing that a first item object OBJa falls at a speed exceeding a first speed, so that a second item object OBJb is installed on a terrain object L.

A fourth example game process that is executed in the game system 1 will be outlined with reference to FIGS. 18 to 20. It should be noted that FIG. 18 is a diagram illustrating an example of a game image showing that a player character PC drops a first item object OBJa from a cliff top. FIG. 19 is a diagram illustrating an example of a game image showing that the first item object OBJa falls at a speed exceeding a first speed, so that an impact is applied on the first item object OBJa. FIG. 20 is a diagram illustrating an example of a game image showing that the first item object OBJa falls at a speed exceeding a first speed, so that a second item object OBJb is installed on a terrain object L.

In FIG. 18, an image is displayed in which the player character PC holding the first item object OBJa with a hand is located on a cliff top in the underground field. The player character PC performs an action of dropping the first item object OBJa from the cliff top according to the user's action instruction. When the first item object OBJa is dropped from the cliff top, the first item object OBJa falls and moves to the bottom of the cliff at a fall speed based on virtual physical calculation (e.g., virtual inertia or gravity) or the like in the virtual space.

In FIG. 19, after dropping from the cliff top, the first item object OBJa hits the terrain object L at the bottom of the cliff at the fall speed. When the first item object OBJa hits another object (e.g., the terrain object L) at a speed exceeding the first speed in the virtual space, the first item object OBJa satisfies the installation condition.

As illustrated in FIG. 20, when the first item object OBJa satisfies the installation condition that hitting is performed at a speed exceeding the above first speed, the first item object OBJa is altered into the second item object OBJb at the hit location, and the second item object OBJb is then installed and fixed to the terrain object L. The second item object OBJb that is installed due to an impact at a speed exceeding the above first speed, has the same function as that of the second item object OBJb installed in the above first example game process. Therefore, in the fourth example game process, a dark, invisible space such as a valley floor is illuminated by dropping the first item object OBJa, so that a situation of surroundings of a terrain, an opponent character, and the like, and an item disposed on a terrain, can be recognized by the user. Thus, when the first item object OBJa hits another object at a speed exceeding the first speed in the virtual space even without the player character PC's attack action, it is determined that an impact has been applied to the first item object OBJa, so that the first item object OBJa is altered into the second item object OBJb on the terrain object L corresponding to the location where the impact has occurred.

Although in the above example, the first item object OBJa alone causes an impact at a speed exceeding the above first speed, a combination equipment object including the first item object OBJa may cause an impact at a speed exceeding the above first speed, so that the above installation condition is satisfied. For example, when the player character PC drops, from a cliff top, a combination equipment object in which an equipment object that is a stick object is combined with the first item object OBJa, then if the combination equipment object hits the terrain object L at a speed exceeding the first speed, the second item object OBJb altered from the first item object OBJa may be installed at the hit location.

In addition, although in the above example, the first item object OBJa released from the player character PC falls and moves at a speed exceeding the first speed and hits the terrain object L, so that the installation condition is satisfied, the installation condition may be satisfied in other fashions. For example, when the player character PC releases the first item object OBJa alone or a combination equipment object including the first item object OBJa in the virtual space, then if the object released by the player character PC's action hits another object at a speed exceeding the above first speed, it may be determined that the above installation condition is satisfied. For example, when the player character PC launches the first item object OBJa alone or a combination equipment object including the first item object OBJa in the virtual space using a bow object or a gun object, by throwing it, by kicking it, by causing it to roll or slide on a slope, or the like, then if the object launched by the player character PC's action hits another object at a speed exceeding the above first speed, the above installation condition may be satisfied. In that case, the above launching action may not be an action of attacking another character.

Thus, in the present example, when it is determined that an impact has been applied to the first item object OBJa in the virtual space, the installation condition is satisfied, and the second item object OBJb is installed, instead of the first item object OBJa, on the terrain object L of the underground field corresponding to the location where the impact has been applied, so that lighting is set such that a predetermined range around the installation location is lighter than before the installation. The above installation condition is satisfied if it is determined that an impact has been applied to the first item object OBJa when the first item object OBJa is located in a range that is covered by the effect of the player character PC's attack action or when the first item object OBJa hits another object at a speed higher than the first speed.

It should be noted that it may be determined that the above installation condition is satisfied due to other actions. For example, when an impact is applied to the first item object OBJa by, for example, the player character PC or another character stamping the first item object OBJa, which action is different from the player character PC's attack action, or when the first item object OBJa alone or the first item object OBJa included in an equipment object hits another object in a predetermined action fashion, it may be determined that the above installation condition is satisfied.

In addition, even when the above installation condition is satisfied, the second item object OBJb may not be installed. For example, in an environment in which the second item object OBJb cannot be installed (e.g., installation is forbidden at the installation location, e.g., the installation location is made of a liquid or viscous material, the installation location is made of a material having at least a predetermined stiffness, and the installation location is a piece of equipment of the player character PC), the second item object OBJb may not be installed. In that case, the first item object OBJa may be placed in the virtual space in a non-installation state without alteration to the second item object OBJb, or may be removed from the virtual space.

In addition, as described above, when the second item object OBJb is installed on the terrain object L, the second item object OBJb continues to emit the above light in the installation state. Even when a game is interrupted, then if the game is resumed from the interrupted state, the second item object OBJb continues to emit light with the same installation location maintained. Therefore, the user can maintain the state of the underground field that has once ensured lightness can be maintained even when a game is interrupted, and therefore, can explore the underground field without re-installing the second item object OBJb on the terrain object L.

In addition, after having once been installed, second item objects OBJb may be removed from the virtual space. As a first example, an installation limitation may be put on second item objects OBJb, and when the installation limitation is exceeded, a second item object OBJb that has already been installed may be removed in a FIFO fashion. The above installation limitation may be provided by putting an upper limit on the number of second item objects OBJb installed, or putting a limit on a period of time for which a second item object OBJb has been installed. As a second example, a second item object OBJb installed on the terrain object L may be destroyed or captured by an action of another character (e.g., an opponent character) automatically controlled by the processor 81 in the virtual space to be removed. For example, in the case in which no second item objects OBJb are removed from the virtual space after having once been installed, second item objects OBJb can be installed in a dark space such as an underground field without a limit, so that it may be excessively easy to explore the field. However, when second item objects OBJb are allowed to be removed from the virtual space after having once been installed as in the above first and second examples and the like, the difficulty of a game can be adjusted.

Figure 21:
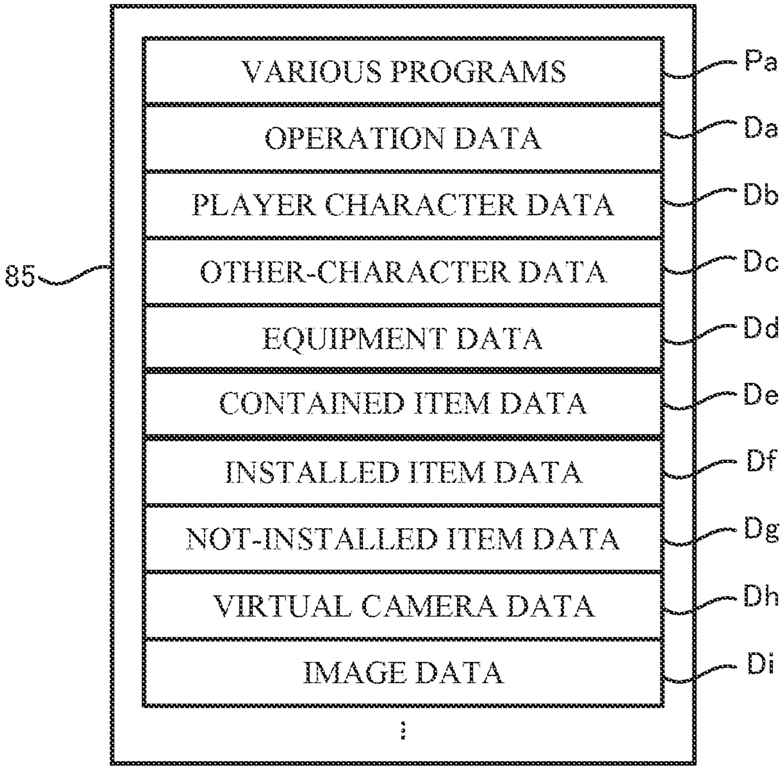
FIG. 21 is a diagram illustrating a non-limiting example of a data area set in a DRAM 85 of a main body apparatus 2.

Next, a specific example of a process executed in the game system 1 will be described with reference to FIG. 21. FIG. 21 is a diagram illustrating an example of a data area set in the DRAM 85 of the main body apparatus 2. It should be noted that the DRAM 85 also stores data used in other processes in addition to the data of FIG. 21, and those data will not be described in detail.

Various programs Pa that are executed in the game system 1 are stored in a program storage area of the DRAM 85. In the present example, the programs Pa include an application program (e.g., a game program) for performing information processing based on data obtained from the left controller 3 and/or the right controller 4, and the main body apparatus 2. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as an information process that are executed in the game system 1 are stored in a data storage area of the DRAM 85. In the present example, the DRAM 85 stores operation data Da, player character data Db, other-character data Dc, equipment data Dd, contained item data De, installed item data Df, not-installed item data Dg, virtual camera data Dh, image data Di, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In the present example, operation data is obtained from each of the left controller 3 and/or the right controller 4 and the main body apparatus 2. The obtained operation data is used to update the operation data Da as appropriate. Note that the operation data Da may be updated for each frame that is the cycle of a process executed in the game system 1, or may be updated each time operation data is obtained.

The player character data Db indicates the place, direction, position, action, state, and the like of a player character PC disposed in the virtual space. The other-character data Dc indicates the places, directions, and positions, actions, states, and the like of other characters disposed in the virtual space.

The equipment data Dd indicates an equipment object(s) and a combination equipment object(s) with which the player character PC is currently equipped, and which of these equipment objects and combination equipment objects is currently used by the player character PC (in a holding position).

The contained item data De indicates the types and number of item objects contained in the player character PC.

The installed item data Df indicates the location, type, and lighting setting of an item object installed on a game field (terrain object L). The not-installed item data Dg indicates the location, type, and lighting setting of each item object placed on a game field (terrain object L) in a non-installation state.

The virtual camera data Dh indicates the location, direction, angle of view, and the like of a virtual camera disposed in the virtual space.

The image data Di is used to display, on a display screen (e.g., the display 12 of the main body apparatus 2), images (e.g., an image of the player character PC, images of other characters, images of objects such as equipment objects and item objects, an image of a field in the virtual space, and a background image).

Figure 22:
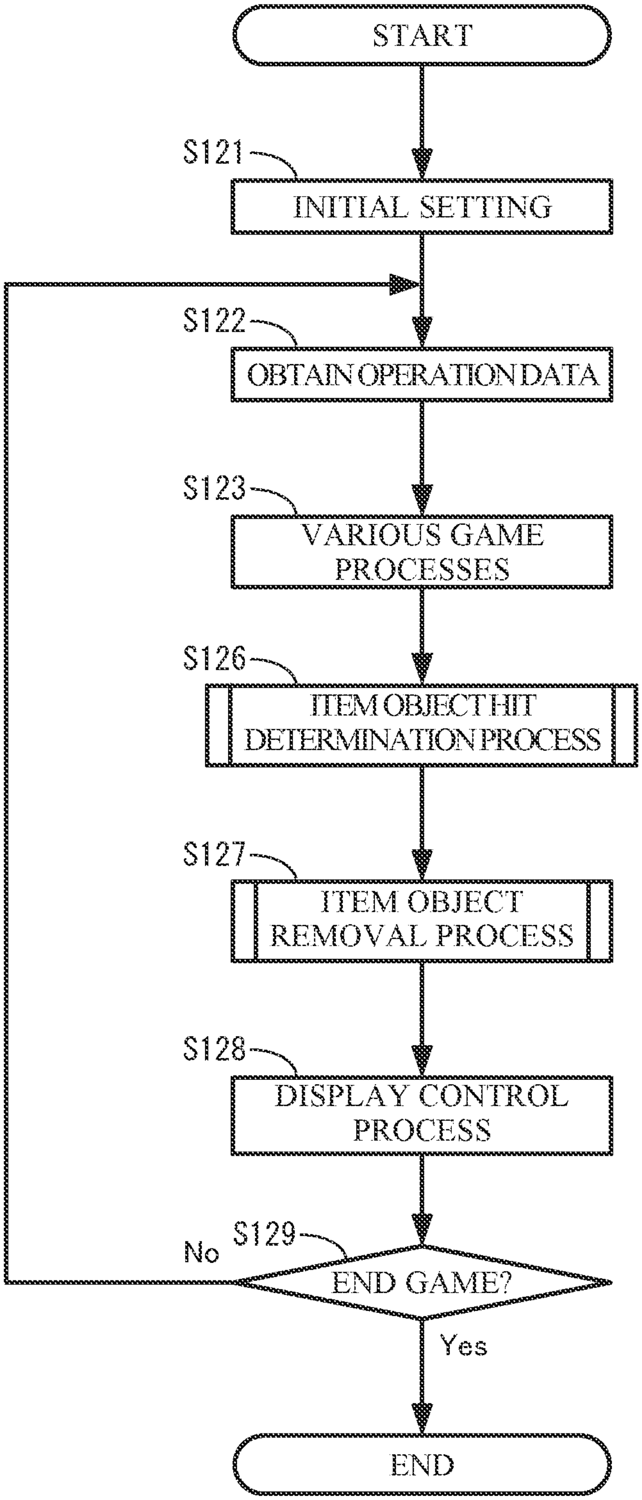
FIG. 22 is a flowchart illustrating a non-limiting example of a game process executed in a game system 1.
Figure 23:
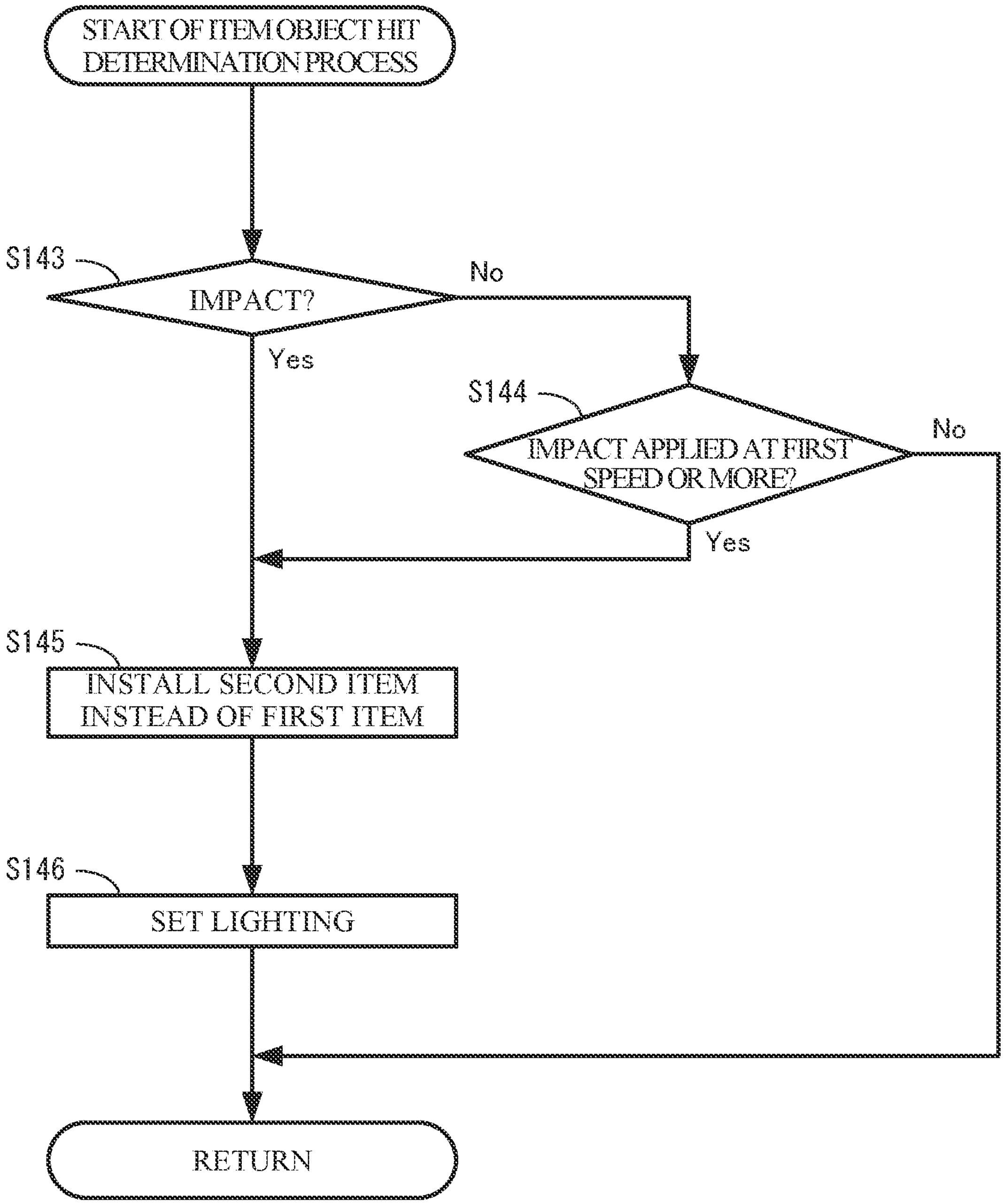
FIG. 23 is a subroutine illustrating a non-limiting example of an item object hit determination process in step S126 of FIG. 22.
Figure 24:
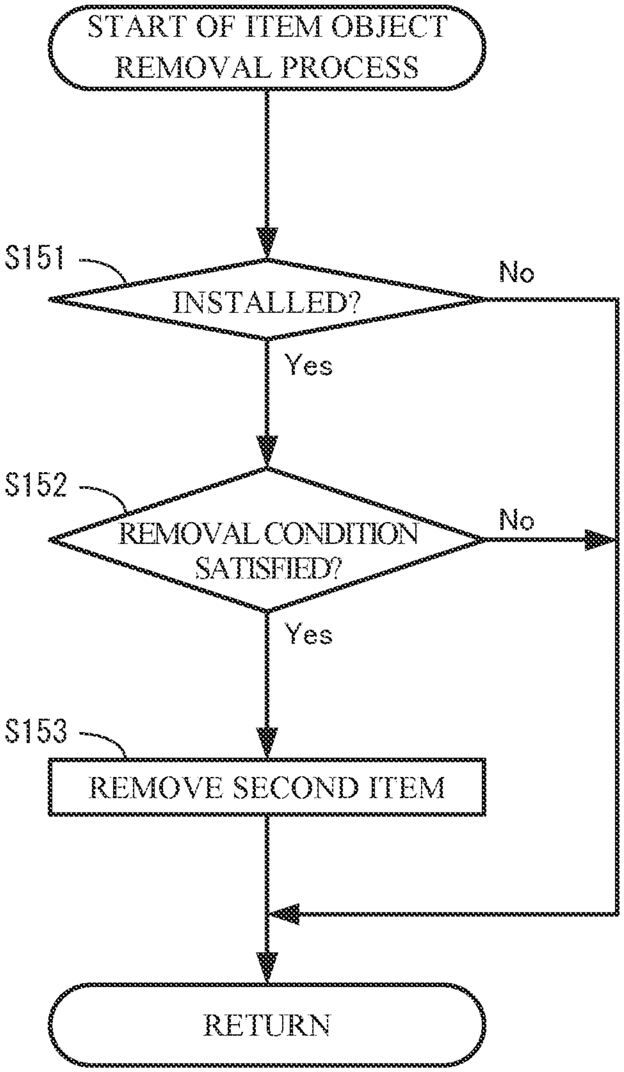
FIG. 24 is a subroutine illustrating a non-limiting example of an item object removal process in step S127 of FIG. 22.

Next, a detailed example of a game process that is an example of an information process of the present example will be described with reference to FIGS. 22 to 24. FIG. 22 is a flowchart illustrating an example of a game process executed in the game system 1. FIG. 23 is a subroutine illustrating an example of an item object hit determination process in step S126 of FIG. 22. FIG. 24 is a subroutine illustrating an example of an item object removal process in step S127 of FIG. 22. In the present example, a series of steps illustrated in FIGS. 22 to 24 are executed by the processor 81 executing a predetermined application program (game program) included the programs Pa. The game processes of FIGS. 22 to 24 are started with any appropriate timing.

It should be noted that the steps in the flowchart of FIGS. 22 to 24, which are merely illustrative, may be executed in a different order, or another step may be executed in addition to (or instead of) each step, if a similar effect is obtained. In the present example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 22 to 24 may be executed by a plurality of information processing apparatuses including the main body apparatus 2 cooperating with each other.

In FIG. 22, the processor 81 performs initial setting for the game process (step S121), and proceeds to the next step. For example, in the initial setting, the processor 81 initializes parameters for performing steps described below, and updates each data. As an example, the processor 81 disposes a player character PC, other characters, a virtual camera, and the like in predetermined positions at default locations in the virtual space, which is in the initial state, and updates the player character data Db, the other-character data Dc, and the virtual camera data Dh. In addition, the processor 81 updates the installed item data Df and the not-installed item data Dg, depending on a situation of an item object in a game field (terrain object L) (e.g., an item object provided in a game field (terrain object L) is set to a default state when a game is first started, and when the game is resumed from a halfway point, the game is set, based on saved data or the like, to a state that had occurred before the game was interrupted).

Next, the processor 81 obtains operation data from the left controller 3, the right controller 4, and/or the main body apparatus 2, and updates the operation data Da (step S122), and proceeds to the next step.

Next, the processor 81 executes various game control processes (step S123), and proceeds to the next step.

As a first example of various game control processes of step S123, the processor 81 executes a player character action process. For example, the processor 81 sets the player character PC's action based on the operation data Da. As an example, the processor 81 sets the place, orientation, position, action, state, and the like of the player character PC based on an operation input indicated by the operation data Da and virtual physical calculation (e.g., virtual inertia and gravity) in the virtual space, and the like, and updates the player character data Db.

Actions performed by the player character PC include actions using an equipment object or a combination equipment object, and the like. For example, when the user provides an instruction to change equipment objects or combination equipment objects with which the player character PC is equipped, the processor 81 changes equipment objects or combination equipment objects possessed by the player character PC according to the instruction, and updates the equipment data Dd based on the change. In addition, the processor 81 causes the player character PC to perform an action of using an equipment object or a combination equipment object based on the equipment data Dd (e.g., attack by swinging a held equipment object or combination equipment object) according to the user's attack action instruction.

In addition, actions performed by the player character PC include an action of using an item object (e.g., the first item object OBJa alone) and the like. For example, when the user provides an instruction to set the player character PC's action of holding the first item object OBJa, the processor 81 sets the first item object OBJa according to the instruction such that the player character PC holds the first item object OBJa, sets a point light source or emission that emits weak light at the first item object OBJa, and updates the player character data Db and the not-installed item data Dg. It should be noted that even unless the above user's instruction has been provided, a point light source or emission that emits weak light when placed alone on the terrain object L may be set at the first item object OBJa. In addition, when the user provides an instruction to set an action of releasing the first item object OBJa held by the player character PC (e.g., the held first item object OBJa is dropped to the vicinity of the feet, the bottom of a cliff, or the like), the processor 81 causes the player character PC to perform the action set by the instruction, and updates the player character data Db. In addition, the processor 81 causes the released first item object OBJa to move in the virtual space, and updates the not-installed item data Dg. If the released first item object OBJa hits the terrain object L or the like before the first speed is reached, the processor 81 places the first item object OBJa at the hit location in a non-installation state, and updates the not-installed item data Dg.

As a second example of various game control processes in step S123, the processor 81 executes an other-character action process. For example, the processor 81 places a character other than the player character PC, controls an action of that other character according to a predetermined rule in a game program, and updates the other-character data Dc.

As a third example of various game control processes in step S123, when the player character PC is performing an action capable of producing a combination equipment object, the processor 81 executes a process of synthesizing a piece of equipment. For example, when in a game, the player character PC is allowed to use an item object and adopts a position to hold an equipment object, the processor 81 executes a process of synthesizing a piece of equipment. For example, the processor 81 chooses an item object to be used in an equipment synthesis process from item objects contained in the player character PC or item objects on a game field (terrain object L), based on the operation data Da, and combines an equipment object possessed by the player character PC with that item object, to synthesize a combination equipment object. Thereafter, the processor 81 changes that equipment object possessed by the player character PC to a combination equipment object (see FIGS. 12 and 15), and updates the equipment data Dd based on the change.

It should be noted that in the above process of synthesizing a piece of equipment, a scene may be displayed in which each object is controlled such that after an item object of interest is placed closer to an equipment object, the item object of interest is removed, and an equipment object of interest possessed by the player character PC is changed to a combination equipment object.

As a fourth example of various game control processes in step S123, the processor 81 executes a process of causing the player character PC to obtain the first item object OBJa based on the operation data Da. For example, when the player character PC performs an action of obtaining the first item object OBJa, the processor 81 adds the first item object OBJa obtained by the action to the player character PC, so that the first item object OBJa is contained in the player character PC, and updates the contained item data De based on a state after the containing.

Next, the processor 81 executes an item object hit determination process (step S126), and proceeds to step S127. The item object hit determination process in step S126 will be described below with reference to FIG. 23.

In FIG. 23, the processor 81 determines, with reference to the equipment data Dd, whether or not an impact has been the first item object OBJa (step S143). If an impact has been applied to the first item object OBJa, the processor 81 proceeds to step S145. Otherwise, i.e., if an impact has not been applied to the first item object OBJa, the processor 81 proceeds to step S144.

As a first example of the case in which it is determined in step S143 that an impact has been applied to the first item object OBJa, the result of the determination in step S143 is positive if an impact has been applied to the first item object OBJa by the player character PC's proximity attack action of attacking using a combination equipment object. For example, the result of the determination by the processor 81 in step S143 is positive based on the player character data Db if an impact has been applied to the first item object OBJa included in a combination equipment object (e.g., a sword object, spear object, or the like combined with the first item object OBJa) used in a proximity attack action due to hitting of the combination equipment object to another object.

As a second example of the case in which it is determined in step S143 that an impact has been applied to the first item object OBJa, the result of the determination in step S143 is positive if an impact has been applied to the first item object OBJa by the player character PC's attack action of attacking using an equipment object. For example, the result of the determination by the processor 81 in step S143 is positive based on the player character data Db and the not-installed item data Dg if an impact has been applied to the first item object OBJa placed on a game field (terrain object L) due to hitting of an equipment object used in an attack action to the first item object OBJa.

As a third example of the case in which it is determined in step S143 that an impact has been applied to the first item object OBJa, the result of the determination in step S143 is positive if an impact has been applied to the first item object OBJa by the player character PC's long-range attack action of attacking using a combination equipment object. For example, the result of the determination by the processor 81 in step S143 is positive based on the player character data Db if an impact has been applied to the first item object OBJa included in a combination equipment object (e.g., a bow and arrow object including an arrow object as the first item object OBJa) used in a long-range attack action due to hitting of at least a portion of the combination equipment object to another object after moving over a long distance.

In step S144, the processor 81 determines whether or not the first item object OBJa has hit another object at a travel speed higher than or equal to a first speed. If the first item object OBJa has hit another object at a travel speed higher than or equal to the first speed, the processor 81 proceeds to step S145. Otherwise, i.e., if the first item object OBJa has not hit another object at a travel speed higher than or equal to the first speed, the processor 81 ends the process of the subroutine.

As a first example of the case in which it is determined in step S144 that the first item object OBJa has hit at a speed higher than or equal to the first speed, the result of the determination in step S144 is positive if the first item object OBJa alone has moved and hit another object at a speed higher than or equal to the first speed in the virtual space. For example, the result of the determination by the processor 81 in step S144 is positive based on the not-installed item data Dg if due to the player character PC's action of releasing the first item object OBJa, which is set by the player character action control process executed in step S123, the first item object OBJa has moved and hit the terrain object L at a speed higher than or equal to the first speed in the virtual space.

As a second example of the case in which it is determined in step S144 that the first item object OBJa has hit at a speed higher than or equal to the first speed, the result of the determination in step S144 is positive if at least a portion of a combination equipment object including the first item object OBJa has moved and hit another object at a speed higher than or equal to the first speed in the virtual space. For example, the result of the determination by the processor 81 in step S144 is positive based on the player character data Db if due to release of at least a portion (e.g., an arrow object combined with the first item object OBJa) of a combination equipment object (e.g., a bow and arrow object in which the first item object OBJa is combined with an arrow object) used in a long-range attack action, the first item object OBJa has moved and hit the terrain object L at a speed higher than or equal to the first speed in the virtual space.

In step S145, the processor 81 alters the first item object OBJa into the second item object OBJb, which is then installed, and proceeds to the next step. As a first example, if the equipment object used in the above attack action has hit the first item object OBJa on the game field (terrain object L), so that an impact has been applied to the first item object OBJa, the processor 81 determines that the installation condition is satisfied, alters the first item object OBJa into the second item object OBJb, installs the second item object OBJb on the terrain object L, and updates the not-installed item data Dg and the installed item data Df. As a second example, if at least a portion of the combination equipment object used in the above attack action has hit another object (e.g., the terrain object L), so that an impact has been applied to the first item object OBJa included in the combination equipment object, the processor 81 determines that the installation condition is satisfied, changes the combination equipment object of the player character PC into an equipment object, installs the second item object OBJb on the terrain object L based on the hit location, and updates the equipment data Dd and the installed item data Df. As a third example, if the first item object OBJa alone has hit another object (e.g., the terrain object L) at a speed higher than or equal to the first speed, the processor 81 determines that the installation condition is satisfied, alters the first item object OBJa into the second item object OBJb, installs the second item object OBJb on the terrain object L based on the hit location, and updates the installed item data Df and the not-installed item data Dg. As a fourth example, if at least a portion of a combination equipment object including the first item object OBJa has hit another object at a speed higher than or equal to the first speed (e.g., the terrain object L), the processor 81 determines that the installation condition is satisfied, changes at least a portion of the combination equipment object, which has hit, into an equipment object, installs the second item object OBJb on the terrain object L based on the hit location, and updates the equipment data Dd and the installed item data Df.

Next, the processor 81 sets lighting based on the installed second item object OBJb (step S146), and ends the process of the subroutine. For example, the processor 81 sets a point light source or surface light source that emits predetermined light at the second item object OBJb, and updates the installed item data Df.

Referring back to FIG. 22, in step S127, the processor 81 executes an item object removal process, and proceeds to step S128. The item object removal process in step S127 will be described below with reference to FIG. 24.

In FIG. 24, the processor 81 determines, with reference to the installed item data Df, whether or not a second item object OBJb has been installed on a game field (terrain object L) (step S151). If a second item object OBJb has been installed, the processor 81 proceeds to step S152. Otherwise, i.e., if a second item object OBJb has not been installed, the processor 81 ends the process of the subroutine.

In step S152, the processor 81 determines whether or not a condition for removing any installed second item object OBJb is satisfied. For example, the result of the determination by the processor 81 in step S152 is positive if a second item object OBJb has been installed to exceed an installation limitation or another character's action that leads to removal of a second item object OBJb has been performed. If the condition for removing any installed second item object OBJb is satisfied, the processor 81 proceeds to step S153. Otherwise, i.e., if the condition for removing any installed second item object OBJb is not satisfied, the processor 81 ends the process of the subroutine.

In step S153, the processor 81 removes a second item object OBJb that satisfies the removal condition, and ends the process of the subroutine. As a first example, if a second item object OBJb has been installed to exceed an installation limitation, the processor 81 removes the second item object OBJb exceeding the installation limitation from the virtual space in a FIFO fashion, and updates the installed item data Df. As a second example, the processor 81 removes an installed second item object OBJb from the virtual space according to another character's action that leads to removal of the second item object OBJb, and updates the installed item data Df.

Referring back to FIG. 22, the processor 81 executes a display control process in step S128, and proceeds to the next step. For example, the processor 81 disposes the player character PC and other characters, and objects such as the first item object OBJa and the second item object OBJb in the virtual space, based on the player character data Db, the other-character data Dc, the installed item data Df, and the not-installed item data Dg. In addition, the processor 81 causes the player character PC to be equipped with an equipment object or a combination equipment object, based on the equipment data Dd. In addition, the processor 81 sets lighting in the virtual space using respective light sources for the first item object OBJa, the second item object OBJb, and the like based on the installed item data Df, and the not-installed item data Dg, or other light sources, environmental light, or the like in the virtual space. In addition, the processor 81 sets the location and/or orientation of a virtual camera for generating a display image, based on the virtual camera data Dh, and disposes the set virtual camera in the virtual space. Thereafter, the processor 81 performs control to generate an image of the virtual space as viewed from the virtual camera, and display the virtual space image on the display 12. It should be noted that the processor 81 may executes a process of controlling movement of the virtual camera in the virtual space, based on the place and position of the player character PC, and update the virtual camera data Dh. In addition, the processor 81 may move the virtual camera in the virtual space based on the operation data Da, and update the virtual camera data Dh.

Next, the processor 81 determines whether or not to end the game process (step S129). The game process in step S129 is ended, for example, if a condition for ending the game process is satisfied, the user has performed an operation of ending the game process, or the like. If the processor 81 determines not to end the game process, the processor 81 returns to and repeats step S122. If the processor 81 determines to end the game process, the processor 81 ends the process of the flowchart. Thereafter, the series of processes of steps S122 to S129 are repeated until the processor 81 determines to end the process in step S129.

Thus, in the present example, the second item object OBJb can be installed in any location in the underground field, and therefore, lightness can be ensured even in the dark space. Therefore, exploration of the underground field can be facilitated by utilizing lighting obtained by setting the second item object OBJb at various locations.

In addition, although in the above examples, the first item object OBJa is altered into the second item object OBJb, the first item object OBJa may be installed on the terrain object L without alteration. In that case, when it is determined that an impact has been applied to the first item object OBJa, so that the installation condition is satisfied, the first item object OBJa is installed, without alteration, on the terrain object L corresponding to the impact-applied location, so that lighting is set in the virtual space such that a predetermined range around the location where the first item object OBJa is installed is lighter than before the installation.

In addition, in the underground field, a space having lightness less than that provided by the environmental light set in the virtual space may be set. For example, in the case in which environmental light that provides predetermined lightness to the entire virtual space is set, an image for displaying to be displayed on the display 12 may be generated by reducing the lightness of an image for displaying the underground field (e.g., by filling with a black color) to a darker level than that provided by the environmental light. In that case, displaying is performed such that the setting of lighting by installing the second item object OBJb is made effective by removing the above lightness reduction process (e.g., removing filling with a black color) for a range that is illuminated by installing the second item object OBJb. Thus, even when the underground field, in which lightness is reduced compared to the other fields, is explored, then if the second item object OBJb, which can ensure lightness around the installation location, is allowed to be installed at any location, the exploration of the underground field can be facilitated by utilizing lighting provided by the second item object OBJb.

In addition, the game system 1 may be any suitable apparatus, including a handheld game apparatus, or any suitable handheld electronic apparatus (a personal digital assistant (PDA), mobile telephone, personal computer, camera, tablet computer, etc.), etc.

In the foregoing, the information processes (game processes) are performed in the game system 1. Alternatively, at least a portion of the process steps may be performed in another apparatus. For example, when the game system 1 can also communicate with another apparatus (e.g., a server, another information processing apparatus, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above example, the information processes can be performed by the processor 81 of the game system 1 executing predetermined programs. Alternatively, all or a portion of the above processes may be performed by a dedicated circuit included in the game system 1.

Here, according to the above variation, the present example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and the present example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While the present example has been described above in detail, the foregoing description is in all aspects illustrative and not restrictive for the present example. It should be understood that numerous other modifications and variations can be devised without departing from the scope of the present example. It should be understood that those skilled in the art could carry out the literal and equivalent scope of the present example based on the description of the present example and common technical knowledge. It should also be understood that the terms as used herein have definitions typically used in the art unless otherwise mentioned. Thus, unless otherwise defined, all scientific and technical terms have the same meanings as those generally used by those skilled in the art to which the present example pertain. If there is any inconsistency or conflict, the present specification (including the definitions) shall prevail.

As described above, the present example is applicable as a game program, game system, game apparatus, game processing method, and the like that are capable of facilitating exploration of a virtual space by utilizing lighting.

What is claimed is:

1. A non-transitory computer-readable storage medium having stored therein a game program that when executed by a computer of an information processing apparatus, causes the computer to perform operations comprising:

performing movement control of a player character in a virtual space, based on a user's operation input;

when it is determined that an impact has been applied to a first object in the virtual space, installing the first object, or a second object instead of the first object, on a terrain object related to a location where the impact has been applied to the first object, and setting lighting in the virtual space such that a range around the location where the first or second object is installed is lighter than before the installation;

generating a combination object by combining the first object with an equipment object with which the player character is allowed to be equipped, based on the user's operation input;

executing a process of causing the player character to perform a proximity attack action using the combination object, based on the user's operation input; and when the combination object hits the terrain object due to the proximity attack action, determining that the impact has been applied to the first object included in the combination object.

2. The non-transitory computer-readable storage medium according to claim 1, wherein the game program further causes the computer to perform operations comprising when the first object is included in a range in which the first object is affected by the proximity attack action, determining that the impact has been applied to the first object.

3. The non-transitory computer-readable storage medium according to claim 1, wherein the game program further causes the computer to perform operations comprising when the first object hits the terrain object due to another attack action, determining that the impact has been applied to the first object.

4. The non-transitory computer-readable storage medium according to claim 3, wherein the game program further causes the computer to perform operations comprising:

executing a process of causing the player character to perform an action of launching the first object in the virtual space as the another attack action, based on the user's operation input; and when the first object launched by the launching action hits the terrain object, determining that the impact has been applied to the first object.

5. The non-transitory computer-readable storage medium according to claim 1, wherein the proximity attack action is used in a range that is directly reached by the player character itself or an object with which the player character is equipped.

6. The non-transitory computer-readable storage medium according to claim 1, wherein the game program further causes the computer to perform operations comprising when the first object hits another object at a first speed or more in the virtual space, determining that the impact has been applied to the first object.

7. The non-transitory computer-readable storage medium according to claim 6, wherein the game program further causes the computer to perform operations comprising:

executing a process of causing the player character to perform a launching action of launching the first object in the virtual space, based on the user's operation input; and when the first object launched by the launching action hits the terrain object at the first speed or more, determining that the impact has been applied to the first object.

8. The non-transitory computer-readable storage medium according to claim 6, wherein the game program further causes the computer to perform operations comprising:

executing a process of causing the player character to perform a dropping action of dropping the first object in the virtual space, based on the user's operation input; and when the first object dropped by the dropping action hits the terrain object at the first speed or more, determining that the impact has been applied to the first object.

9. The non-transitory computer-readable storage medium according to claim 1, wherein the game program further causes the computer to perform operations comprising:

automatically controlling actions of an opponent character in the virtual space; and removing the first or second object installed in the virtual space, depending on an action of the opponent character.

10. The non-transitory computer-readable storage medium according to claim 1, wherein the game program further causes the computer to perform operations comprising when the number of the first and second objects installed in the virtual space reaches a first value, or when a first period of time has passed since the installation of the first and second objects on the terrain object, removing at least one of the first and second objects installed in the virtual space.

11. The non-transitory computer-readable storage medium according to claim 1, wherein the first object is allowed to be obtained and possessed by the player character in the virtual space.

12. The non-transitory computer-readable storage medium according to claim 1, wherein the game program further causes the computer to perform operations comprising when the first object hits another object due to the proximity attack action, determining that the impact has been applied to the first object.

13. A game system comprising:

a memory and a processor configured to cooperate to at least:

perform movement control of a player character in a virtual space, based on a user's operation input; and when it is determined that an impact has been applied to a first object in the virtual space, install the first object, or a second object instead of the first object, on a terrain object related to a location where the impact has been applied to the first object, and set lighting in the virtual space such that a range around the location where the first or second object is installed is lighter than before the installation;

generate a combination object by combining the first object with an equipment object with which the player character is allowed to be equipped, based on the user's operation input;

execute a process of causing the player character to perform a proximity attack action using the combination object, based on the user's operation input; and when the combination object hits the terrain object due to the proximity attack action, determine that the impact has been applied to the first object included in the combination object.

14. The game system according to claim 13, wherein the processor is further configured to at least when the first object is included in a range in which the first object is affected by the proximity attack action, determine that the impact has been applied to the first object.

15. The game system according to claim 13, wherein the processor is further configured to at least when the first object hits the terrain object due to another attack action, determine that the impact has been applied to the first object.

16. The game system according to claim 15, wherein the processor is further configured to at least:

execute a process of causing the player character to perform an action of launching the first object in the virtual space as the another attack action, based on the user's operation input; and when the first object launched by the launching action hits the terrain object, determine that the impact has been applied to the first object.

17. The game system according to claim 15, wherein the proximity attack action is used in a range that is directly reached by the player character itself or an object with which the player character is equipped.

18. The game system according to claim 13, wherein the processor is further configured to at least when the first object hits another object at a first speed or more in the virtual space, determine that the impact has been applied to the first object.

19. The game system according to claim 18, wherein the processor is further configured to at least:

execute a process of causing the player character to perform a launching action of launching the first object in the virtual space, based on the user's operation input; and when the first object launched by the launching action hits the terrain object at the first speed or more, determine that the impact has been applied to the first object.

20. The game system according to claim 18, wherein the processor is further configured to at least:

execute a process of causing the player character to perform a dropping of dropping the first object in the virtual space, based on the user's operation input; and when the first object dropped by the dropping action hits the terrain object at the first speed or more, determine that the impact has been applied to the first object.

21. The game system according to claim 13, wherein the processor is further configured to at least:

automatically control actions of an opponent character in the virtual space; and remove the first or second object installed in the virtual space, depending on an action of the opponent character.

22. The game system according to claim 13, wherein the processor is further configured to at least when the number of the first and second objects installed in the virtual space reaches a first value, or when a first period of time has passed since the installation of the first and second objects on the terrain object, remove at least one of the first and second objects installed in the virtual space.

23. The game system according to claim 13, wherein the first object is allowed to be obtained and possessed by the player character in the virtual space.

24. The game system according to claim 13, wherein the processor is further configured to at least when the first object hits another object due to the proximity attack action, determine that the impact has been applied to the first object.

25. A game apparatus, comprising:

at least one memory storing a non-transitory computer-readable storage medium having a game program stored thereon; and a processor configured to execute the game program to perform operations comprising:

performing movement control of a player character in a virtual space, based on a user's operation input; when it is determined that an impact has been applied to a first object in the virtual space, installing the first object, or a second object instead of the first object, on a terrain object related to a location where the impact has been applied to the first object, and setting lighting in the virtual space such that a range around the location where the first or second object is installed is lighter than before the installation;

generating a combination object by combining the first object with an equipment object with which the player character is allowed to be equipped, based on the user's operation input;

executing a process of causing the player character to perform a proximity attack action using the combination object, based on the user's operation input; and when the combination object hits the terrain object due to the proximity attack action, determining that the impact has been applied to the first object included in the combination object.

26. A game processing method for causing a processor of an information processing apparatus to at least:

perform movement control of a player character in a virtual space, based on a user's operation input;

when it is determined that an impact has been applied to a first object in the virtual space, install the first object, or a second object instead of the first object, on a terrain object related to a location where the impact has been applied to the first object, and set lighting in the virtual space such that a range around the location where the first or second object is installed is lighter than before the installation;

generating a combination object by combining the first object with an equipment object with which the player character is allowed to be equipped, based on the user's operation input;

executing a process of causing the player character to perform a proximity attack action using the combination object, based on the user's operation input; and when the combination object hits the terrain object due to the proximity attack action, determining that the impact has been applied to the first object included in the combination object.

* * * * *